US008973871B2

United States Patent
Marcoe et al.

(10) Patent No.: US 8,973,871 B2
(45) Date of Patent: Mar. 10, 2015

(54) BOX STRUCTURES FOR CARRYING LOADS AND METHODS OF MAKING THE SAME

(71) Applicant: The Boeing Company, Chicago, IL (US)

(72) Inventors: Jeffery L. Marcoe, Bellevue, WA (US); Paul S. Nordman, Renton, WA (US); Stephen T. Brown, Lake Havasu, AZ (US); William G. Roeseler, Kirkland, WA (US); Terry K. Isomura, Clinton, WA (US); Willard N. Westre, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 13/751,086

(22) Filed: Jan. 26, 2013

(65) Prior Publication Data

US 2014/0209744 A1 Jul. 31, 2014

(51) Int. Cl.
*B64C 3/00* (2006.01)
*B64C 3/18* (2006.01)
*B64F 5/00* (2006.01)

(52) U.S. Cl.
CPC ............... *B64C 3/185* (2013.01); *B64F 5/0009* (2013.01)
USPC .................... 244/123.7; 244/123.1; 264/258; 156/293

(58) Field of Classification Search
USPC ................. 244/123.7, 123.1, 123.13, 123.14, 244/123.8, 123.9
See application file for complete search history.

(56) References Cited

U.S. PATENT DOCUMENTS

| | | | |
|---|---|---|---|
| 5,435,504 A | 7/1995 | Inoue et al. | |
| 5,496,002 A | 3/1996 | Schutze | |
| 5,641,366 A | 6/1997 | Hohman | |
| 5,721,034 A | 2/1998 | Seemann, III et al. | |
| 5,848,765 A | 12/1998 | Gillespie | |
| 5,875,732 A | 3/1999 | Chapman et al. | |
| 6,179,945 B1 | 1/2001 | Greenwood et al. | |
| 6,190,484 B1 | 2/2001 | Appa | |
| 6,234,423 B1 | 5/2001 | Hirahara et al. | |
| 6,237,873 B1 | 5/2001 | Amaoka et al. | |
| 6,513,757 B1 | 2/2003 | Amaoka et al. | |
| 6,945,727 B2 * | 9/2005 | Christman et al. | 403/109.8 |
| 7,371,304 B2 * | 5/2008 | Christman et al. | 156/293 |
| 7,721,495 B2 | 5/2010 | Kismarton | |
| 7,807,249 B2 | 10/2010 | Kismarton | |

(Continued)

OTHER PUBLICATIONS

C.O. Stephens, et al., "Final Report on Development of Advanced Composite Vertical Stabilizer for DC-10 Transport Aircraft", NASA Contractor Report 178014, McDonnell Douglas Corporation, Douglas Aircraft Company, Long Beach, California, May 1988, 183 pages.

*Primary Examiner* — Christopher P Ellis
*Assistant Examiner* — Medhat Badawi

(57) ABSTRACT

There is provided a box structure for carrying load having upper and lower composite integrated sandwich panels. The panels have facesheets sandwiching one or more core portions and adjacent dense packs oriented in an axial direction. The box structure further has a plurality of spars. Each spar has a web and web attachments and has a spar length in the axial direction. The plurality of spars are connected to the panels with the web attachments located at the dense packs. The facesheets are configured to carry primarily torsion and pressure loads in shear and no significant axial loads. The dense packs are configured to carry all significant box bending in axial tension and compression loads.

25 Claims, 11 Drawing Sheets

(56) References Cited

U.S. PATENT DOCUMENTS

| | | | |
|---|---|---|---|
| 8,104,714 B2* | 1/2012 | Brown et al. | 244/123.8 |
| 8,540,833 B2* | 9/2013 | Deobald et al. | 156/180 |
| 2004/0011927 A1* | 1/2004 | Christman et al. | 244/131 |
| 2006/0214058 A1* | 9/2006 | Westre et al. | 244/119 |
| 2006/0283133 A1* | 12/2006 | Westre et al. | 52/729.1 |
| 2007/0235129 A1* | 10/2007 | Christman et al. | 156/293 |
| 2008/0131661 A1* | 6/2008 | Albers et al. | 428/139 |
| 2009/0084899 A1* | 4/2009 | Kismarton et al. | 244/123.1 |
| 2009/0095413 A1* | 4/2009 | Westre et al. | 156/257 |
| 2010/0243803 A1* | 9/2010 | Westre et al. | 244/119 |
| 2013/0075529 A1* | 3/2013 | Marcoe | 244/131 |
| 2013/0099058 A1* | 4/2013 | Payne et al. | 244/123.1 |
| 2013/0320142 A1* | 12/2013 | Nordman | 244/123.5 |
| 2014/0070053 A1* | 3/2014 | Kismarton | 244/123.7 |

\* cited by examiner

BOX STRUCTURES FOR CARRYING LOADS AND METHODS OF MAKING THE SAME

BACKGROUND

1) Field of the Disclosure

The disclosure relates generally to box structures for carrying loads and methods for making the same, and more particularly, to composite bonded box structures for vehicles and architectural structures, and methods of making the same.

2) Description of Related Art

Composite structures, such as carbon fiber-reinforced plastic (CFRP) composite structures, are used in a wide variety of applications, including in the manufacture of aircraft, spacecraft, rotorcraft, automobiles, watercraft, and other vehicles and structures, due to their high strength-to-weight ratios, corrosion resistance, and other favorable properties. For example, in aircraft construction, composite structures are used in increasing quantities to form the wings, tail sections, fuselage, and other components.

Existing composite aircraft transport wing and stabilizer box structures may utilize integrally stiffened panel structures consisting of outer composite wing skin panels, i.e., "skins", mechanically attached or bonded to an internal wing framework. The internal wing framework may typically consist of reinforcing structures such as spars, ribs, and stringers to improve the strength, stiffness, buckling resistance, and stability of the skins.

Such composite aircraft transport wing and stabilizer box structures are typically fabricated in three separate sections, including the left side outboard wing or stabilizer, the right side outboard wing or stabilizer, and the center section, and such sections are then assembled together. The fabrication process may involve extensive time and manual labor to assemble a large number of component parts, and this may result in increased manufacturing costs. In addition, such sections may be joined together with numerous mechanical fasteners, such as interference fit fasteners, for primary joining purposes. Such fasteners may be made of strong and heavy materials to impart sufficient strength to the sections, hold the sections together during operation of the aircraft, and withstand various aerodynamic loads and stresses. However, the use of numerous heavy fasteners may add weight to the aircraft, which, in turn, may decrease the aircraft's performance and may result in increased fuel required for a given flight profile. This increased fuel requirement may, in turn, result in increased fuel costs. In addition, such fasteners may require additional fuel tight sealing which may increase the fabrication time, labor and cost, and which, in turn, may increase the overall manufacturing and operation costs. Further, the use of numerous fasteners made of metal installed through the outer composite wing skin panels may result in an increased risk of a lightning strike to the wing.

In addition, existing composite aircraft transport wing and stabilizer box structures may typically follow known metal wing box semi-monocoque primary load distribution. As used herein, "semi-monocoque" means a construction approach that supports structural loads by using an object's outer or external skin and stringers, as opposed to using an internal framework that is then covered with a non-load carrying skin. This approach typically requires near traditional 0°/+45°/90° (zero degrees/plus or minus forty-five degrees/ninety degrees) quasi-isotropic (e.g., orientation of fibers in several or more directions in-plane), axially stiffened ply layup orientations that distribute the aircraft transport wing and stabilizer box bending and torsion into both the skins and stringers to provide multiple fail-safe load paths. However, such approach may compromise the efficiency of those composite components and may significantly increase part count in the ribs and fastener attachments in order to maintain stability of the composite aircraft transport wing and stabilizer box structure.

Accordingly, there is a need in the art for improved composite bonded box structures and methods of making the same that provide advantages over known structures and methods.

SUMMARY

This need for improved composite bonded box structures and methods of making the same is satisfied. As discussed in the below detailed description, embodiments of the improved composite bonded transport wing and stabilizer box structures and methods of making the same may provide significant advantages over existing structures and methods.

In an embodiment of the disclosure, there is provided a box structure for carrying load. The box structure comprises upper and lower composite integrated sandwich panels. The integrated sandwich panels have facesheets sandwiching one or more core portions and adjacent dense packs oriented in an axial direction. The box structure further comprises a plurality of spars. Each spar comprises a web and web attachments and has a spar length in the axial direction. The plurality of spars are connected to the integrated sandwich panels with the web attachments located at the dense packs. The facesheets are configured to carry primarily torsion and pressure loads in shear and no significant axial loads, and the dense packs are configured to carry all significant box bending in axial tension and compression loads.

In another embodiment of the disclosure, there is provided an air vehicle having a bonded box structure for carrying load. The air vehicle comprises an airfoil frame having a first tip and a second tip. The air vehicle further comprises a bonded box structure attached to the airfoil frame. The bonded box structure comprises upper and lower composite integrated sandwich panels continuous from the first tip to the second tip of the airfoil frame. The integrated sandwich panels have facesheets sandwiching one or more core portions and adjacent dense packs oriented in an axial direction. The bonded box structure further comprises a plurality of spars. Each spar comprises a web and web attachments and each spar has a spar length in the axial direction. The plurality of spars are connected to the integrated sandwich panels with the web attachments located at the dense packs. The facesheets are configured to carry primarily torsion and pressure loads in shear and no significant axial loads. The dense packs are configured to carry all significant box bending in axial tension and compression loads.

In another embodiment of the disclosure, there is provided a method of making a bonded box structure for an air vehicle. The method comprises the step of forming a pair of integrated sandwich panels. Each integrated sandwich panel is formed by fabricating a composite skin by sandwiching a core portion between at least two composite facesheets. Each composite facesheet is formed by laying up a facesheet composite ply layup substantially comprised of bias oriented plies, and designing the facesheet composite ply layup to enable the composite skin to provide continuous torsion, shear, and pressure load paths. Each integrated sandwich panel is further formed by joining a plurality of dense packs to the composite skin. Each dense pack is formed by laying up a dense pack composite ply layup comprised of a substantially orthogonal, unidirectional composite tape laminate, and designing the dense pack composite ply layup to enable the dense packs to provide continuous bending and axial load paths. The method further comprises the step of bonding a plurality of spars and stabilizing ribs between the pair of integrated sandwich panels to form a bonded box structure for an air vehicle. The bonded box structure has a unitary configuration.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1A:
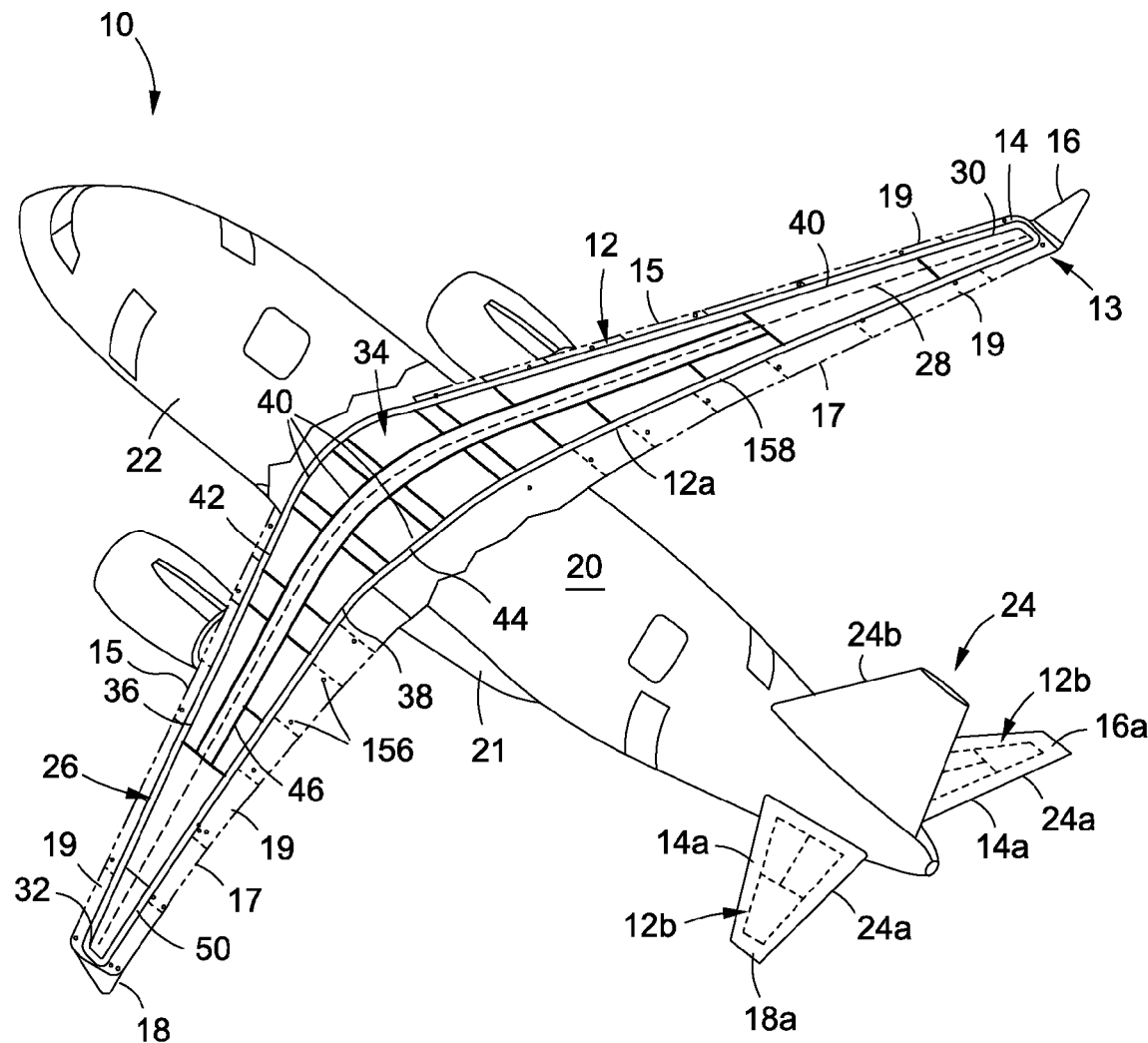
FIG. 1A is an illustration of a perspective view of an air vehicle incorporating embodiments of a box structure of the disclosure.

Now referring to the Figures, FIG. 1A is an illustration of a perspective view of an air vehicle 10, such as an aircraft, incorporating embodiments of a box structure 12 made or fabricated by one of the embodiments of a method 300 (see FIG. 13) of the disclosure. As shown in FIG. 1A, the air vehicle 10 comprises a transport wing structure 13 having an airfoil frame 14. The airfoil frame 14 includes a leading edge 15, a first tip 16, a trailing edge 17, a second tip 18, and a plurality of control surfaces 19. In one embodiment, as shown in FIG. 1A, the box structure 12 may comprise a transport wing box structure 12a that may be attached to or incorporated into the airfoil frame 14 of the transport wing structure 13. The transport wing box structure 20 may be attached over a top portion 20 (see FIG. 1A), through a middle portion 21 (see FIG. 1A), or attached to an under portion (not shown) of a fuselage 22 of the air vehicle 10. As shown in FIG. 1A, the air vehicle 10 further comprises one or more stabilizer structures 24 comprising horizontal stabilizers 24a and vertical stabilizer 24b. The stabilizer structure 24, such as horizontal stabilizers 24a, in combination, may have an airfoil frame 14a having a first tip 16a and a second tip 18a. In another embodiment, as shown in FIG. 1A, the box structure 12 may comprise a stabilizer box structure 12b that may be attached to or incorporated into the airfoil frame 14a of one or more of the stabilizer structures 24. Preferably, the box structure 12 is bonded, has a unitary (one-piece) configuration 26 (see FIG. 1A) and provides one or more continuous load paths 28 across the box structure 12.

In an embodiment of the disclosure, as shown in FIGS. 1A-2C, there is provided a box structure 12 for carrying load. As discussed above, the box structure 12 may comprise in one embodiment, as shown in FIG. 1A, a transport wing box structure 12a, and in another embodiment may comprise a stabilizer box structure 12b. In particular, the box structure 12 may, for example, comprise an aircraft wing box structure, a stabilizer box structure including a horizontal stabilizer, a vertical stabilizer, a tailplane, and a canard, a rotorcraft rotor blade, a helicopter blade, an air vehicle cantilevered structure, an air vehicle torque box structure, or another suitable box structure architecture, such as a torque box type of structure. Although the air vehicle 10 shown in FIG. 1A is generally representative of a commercial passenger aircraft, the one or more embodiments of the box structure 12, as disclosed herein, may also be employed in other types of air vehicles. More specifically, the teachings of the disclosed embodiments may be applied to other passenger aircraft, cargo aircraft, military aircraft, rotorcraft, and other types of air vehicles having a box structure architecture, such as a torque box type of structure. In addition, the teachings of the disclosed embodiments may be applied to windmill structures including windmill blades; automobile structures including automobile spoilers; watercraft structures including boat rotor blades; and other vehicles or architectural structures that utilize a box structure architecture, such as a torque box type of structure.

Figure 1B:
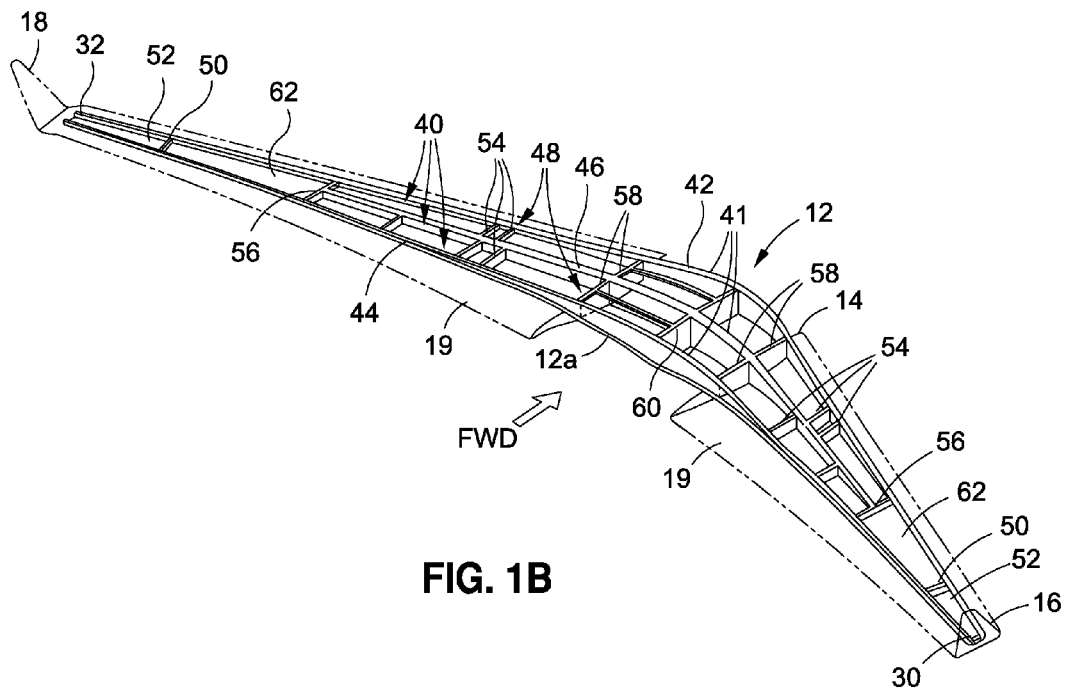
FIG. 1B is an illustration of a perspective back to forward view of one of the embodiments of a box structure of the disclosure.
Figure 2A:
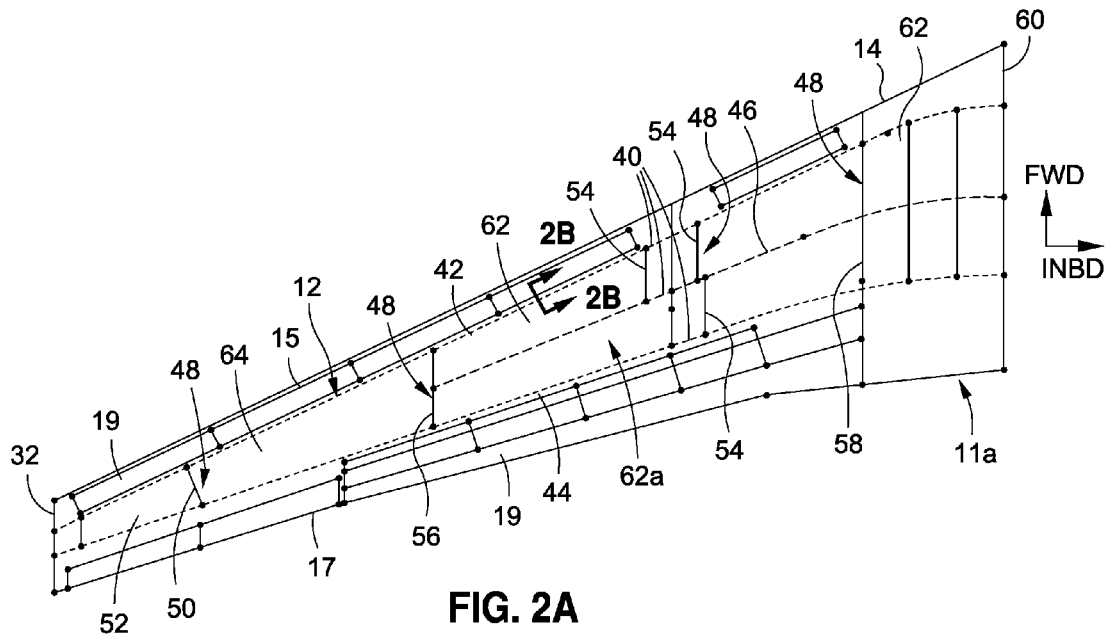
FIG. 2A is an illustration of a partial plan view of an upper surface of one of the embodiments of a box structure of the disclosure.

FIG. 1B is an illustration of a perspective back to forward view of one of the embodiments of the box structure 12, such as in the form of transport wing box structure 12a. As shown in FIGS. 1A-1B, the box structure 12 preferably has a first end 30, a second end 32, a body 34 (see FIG. 1A), a leading edge 36 (see FIG. 1A), and a trailing edge 38 (see FIG. 1A). The box structure 12 further has an upper surface 11a (see FIG. 2A) and a lower surface 11b (see FIG. 2C). FIG. 2A is an illustration of a partial plan view of the upper surface 11a of one of the embodiments of the box structure 12 of the disclosure. FIG. 2C is an illustration of a partial plan view of the lower surface 11b of one of the embodiments of the box structure 12 of the disclosure.

Figure 3A:
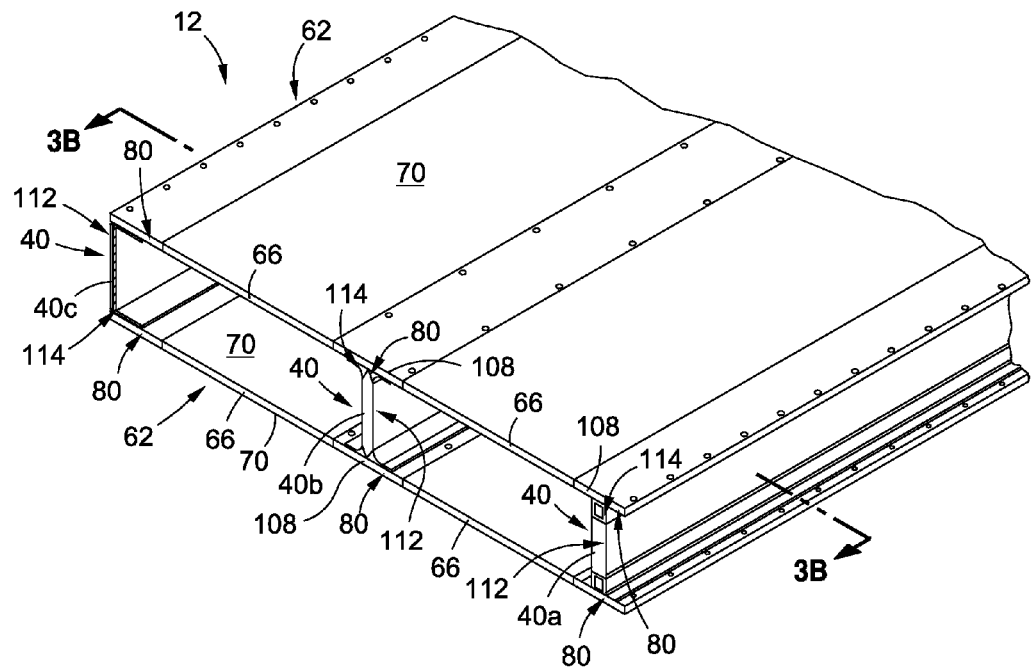
FIG. 3A is an illustration of a partial perspective view of one of the embodiments of a box structure of the disclosure having multiple spar configurations.

As shown in FIGS. 1B and 2A, the box structure 12 comprises a plurality of spars 40 and a plurality of stabilizing ribs 48 bonded or joined to and disposed between a pair of integrated sandwich panels 62. As shown in FIG. 3A, each spar 40 comprises a web 112 and web attachments 114 and has a spar length in the axial direction. As further shown in FIGS. 1B and 2A, the plurality of spars 40 preferably comprises three spars 40, including a front spar 42, a rear spar 44, and an intermediate spar 46. The front spar 42 is preferably positioned spanwise along the leading edge 36 of the box structure 12. The rear spar 44 is preferably positioned spanwise along the trailing edge 38 of the box structure 12. The intermediate spar 46 is preferably positioned spanwise centrally along the body 34 of the box structure 12. The plurality of spars 40 may be constructed with a curved configuration 41 (see FIG. 1B). As shown in FIG. 1B, the plurality of spars 40 are preferably continuous between the first tip 16 and the second tip 18 of the airfoil frame 14, and the front spar 42 and the rear spar 44 are preferably continuous from the first tip 16 to the second tip 18 of the airfoil frame 14. The plurality of spars 40 may provide strength to the box structure 12 and may carry axial forces and bending moments.

In one embodiment, the plurality of spars 40 may be formed with a spar sandwich construction 97 (see FIG. 10) comprising a core portion 66 sandwiched between at least two spar facesheets 98. Each spar facesheet 98 preferably has a spar facesheet composite ply layup 103 (see FIG. 10) comprised of a substantially quasi-isotropic composite tape laminate 87 (see FIG. 10). In one embodiment, the plurality of stabilizing ribs 48 may be formed with a sandwich construction similar to the spar sandwich construction 97 (see FIG. 10) comprising a core portion sandwiched between at least two facesheets. Each rib facesheet (not shown) preferably has a rib facesheet composite ply layup (not shown) comprised of a substantially quasi-isotropic composite tape laminate similar to the substantially quasi-isotropic composite tape laminate 87 of the spar facesheet composite ply layup 103 (see FIG. 10).

As further shown in FIGS. 1B and 2A, the plurality of stabilizing ribs 48 provide support to the box structure 12a and separate individual fuel tanks within the transport wing structure 13 (see FIG. 1A). The plurality of stabilizing ribs 48 preferably intersect with the plurality of spars 40 in the body 34 of the box structure 12. As shown in FIGS. 1B and 2A, the plurality of stabilizing ribs 48 may preferably comprise tank end ribs 50 adjacent surge fuel tanks 52 and intersecting between the front spar 42 and the rear spar 44. As shown in FIGS. 1B and 2A, the plurality of stabilizing ribs 48 may preferably further comprise strut attach ribs 54 intersecting between the front spar 42 and the intermediate spar 46 or intersecting between the rear spar 44 and the intermediate spar 46. As shown in FIGS. 1B and 2A, the plurality of stabilizing ribs 48 may preferably further comprise flap track and intermediate spar termination ribs 56 intersecting between front spar 42, the intermediate spar 46 and the rear spar 44. As shown in FIGS. 1B and 2A, the plurality of stabilizing ribs 48 may preferably further comprise side of fuselage integration ribs 58 near centerline rib 60 of the box structure 12 and intersecting between front spar 42, the intermediate spar 46 and the rear spar 44. The stabilizing ribs 48 may transfer load among the plurality of spars 40 and integrated sandwich panels 62.

Figure 2B:
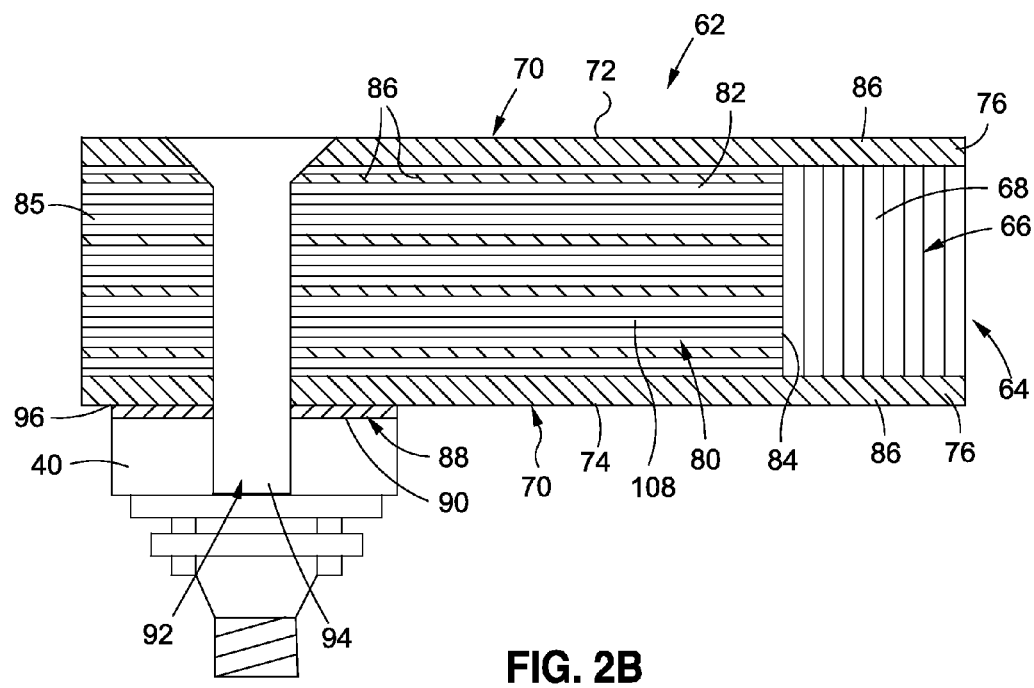
FIG. 2B is an illustration of a cross-sectional view taken along lines 2B-2B of FIG. 2A showing one embodiment of an integrated sandwich panel of the disclosure joined to a spar.
Figure 2C:
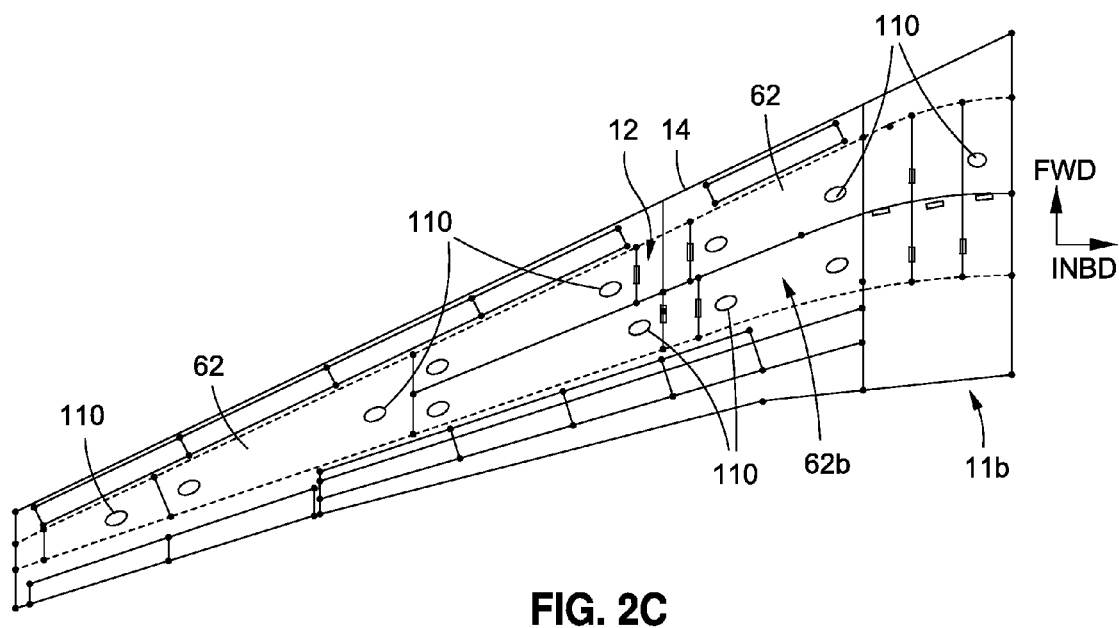
FIG. 2C is an illustration of a partial plan view of a lower surface of one of the embodiments of a box structure of the disclosure showing access openings.

As shown in FIGS. 2A, 2B, 2C, the box structure 12 comprises a pair of integrated sandwich panels 62. Preferably, the integrated sandwich panels 62 are composite integrated sandwich panels. The pair of integrated sandwich panels 62 are preferably continuous from the first tip 16 to the second tip 18 of the airfoil frame 14 (see FIG. 1A) to which the box structure 12 may be attached. The integrated sandwich panels 62 preferably comprise an upper integrated sandwich panel 62a (see FIG. 2A) and a lower integrated sandwich panel 62b (see FIG. 2C). FIG. 2B is an illustration of a cross-sectional view taken along lines 2B-2B of FIG. 2A showing one embodiment of the integrated sandwich panel 62 joined to a spar 40.

As shown in FIG. 2B, each integrated sandwich panel 62 has a sandwich construction that provides increased stabilization of the integrated sandwich panel 62. As further shown in FIG. 2B, each of the integrated sandwich panels 62 comprises facesheets 70 (see FIG. 2B), such as composite skin facesheets, sandwiching one or more core portions 66 and adjacent dense packs 80 oriented in an axial direction. As shown in FIG. 2B, the core portion 66 and the dense pack 80 are sandwiched between two facesheets 70. A composite skin 64 (see FIG. 2B) is preferably formed by sandwiching the core portion 66 between at least two facesheets 70, such as two composite skin facesheets. The core portion 66 preferably comprises a honeycomb core 68 (see FIG. 2B). However, the core portion 66 may also comprise a foam core, a foam core with fiber reinforcement, a closed cell foam, a truss structure, or another suitable core material or structure as will be appreciated by those skilled in the art. The dense pack 80 is a type of a spar cap 108 (see FIG. 2B). As used herein, "dense pack" means a type of spar cap that is attached to the facesheets, such as the composite skin facesheets, of the integrated sandwich panels and that acts as a spar cap. As shown in FIG. 3A, the plurality of spars 40 are connected to the integrated sandwich panels 62 with the web attachments 114 located at the dense packs 80.

As further shown in FIG. 2B, the facesheets 70 may comprise an outer facesheet 72 and an inner facesheet 74. As shown in FIG. 2B, in one embodiment, the facesheets 70, such as in the form of outer facesheet 72 and inner facesheet 74, each has a facesheet composite ply layup 76 substantially comprised of bias oriented plies 86. As used herein, "bias oriented plies" means any plies at angles other than zero degrees (0°) or about zero degrees (0°), and other than ninety degrees (90°), and as used herein "about zero degrees (0°)" means a range of from zero degrees (0°) to ten degrees (10°). Preferably, the bias oriented plies 86 comprise plies with fibers oriented at plus or minus forty-five degrees (±45°) or about plus or minus forty-five degrees (±45°). As used herein "about plus or minus forty-five degrees (±45°)" means a range of from plus or minus forty degrees (±40°) to plus or minus fifty degrees (±50°). More preferably, the facesheet composite ply layup 76 may comprise 70%-80% bias oriented plies 86 with fibers oriented at plus or minus forty-five degrees (±45°) or about plus or minus forty-five degrees) (±45°); 10%-20% plies with fibers oriented at ninety degrees (90°) or about ninety degrees (90°) where "about ninety degrees (90°)" means a range of eighty-five degrees (85°) to ninety-five degrees (95°); and 0%-20% unidirectional plies 85 (see FIG. 2B) with unidirectional fibers oriented at zero degrees (0°) or about zero degrees (0°). Most preferably, the facesheet composite ply layup 76 may comprise 80% bias oriented plies 86 with fibers oriented at plus or minus forty-five degrees (+/−45°) or about plus or minus forty-five degrees (+/−45°); 10% plies with fibers oriented at ninety degrees (90°) or about ninety degrees (90°); and 10% unidirectional plies 85 with unidirectional fibers oriented at zero degrees (0°) or about zero degrees (0°). The facesheets 70 are configured to carry primarily torsion and pressure loads in shear and no significant axial loads. The facesheet composite ply layup 76 is preferably designed to enable the facesheets 70 to provide only continuous torsion, shear, and pressure load paths 28 (see FIG. 1A) across the box structure 12 (see FIG. 1A) and across the transport wing structure 13 (see FIG. 1A) or the stabilizer structures 24 (see FIG. 1A).

The facesheets 70, such as in the form of composite skin facesheets, may be formed by laying up the bias oriented plies 86, and preferably bias oriented plies 86 with fibers oriented at plus or minus forty-five degrees (±45°) or about plus or minus forty-five degrees (±45°), the plies with fibers oriented at ninety degrees (90°) or about ninety degrees (90°), and/or the unidirectional plies 85 with unidirectional fibers oriented at zero degrees (0°) or about zero degrees (0°), on a tool, such as a mold tool, in the desired facesheet composite ply layup 76 and arranging the facesheets 70, so as to define a space between them to be filled with the core portion 66, or alternatively, arranging the facesheets 70 over the core portion 66 so as to sandwich the core portion 66.

As further shown in FIG. 2B, each integrated sandwich panel 62 further comprises dense packs 80 adjacent to the one or more core portions 66 and joined to, preferably by bonding, and integrated with the facesheets 70. As shown in FIG. 2B, in one embodiment, each dense pack 80 preferably has a dense pack composite ply layup 82 comprised of a substantially orthogonal, unidirectional composite tape laminate 84 comprised of unidirectional plies oriented at zero degrees (0°) or about zero degrees (0°). As used herein "about zero degrees (0°)" means a range from zero degrees (0°) to ten degrees (10°). In another embodiment, more preferably, the dense pack composite ply layup 82 may comprise 70%-100% substantially orthogonal, unidirectional composite tape laminate 84 comprised of unidirectional plies 85 with unidirectional fibers oriented at zero degrees (0°) or about zero degrees (0°); 0%-25% bias oriented plies 86 with fibers oriented at an orientation in a range of plus or minus fifty degrees (±50°) to plus or minus seventy-five degrees (±75°), and more preferably at plus or minus sixty-fifty degrees (±65°); and 0%-10% plies with fibers oriented at ninety degrees (90°). Most preferably, the dense pack composite ply layup 82 may comprise 80% substantially orthogonal unidirectional plies with unidirectional fibers oriented at zero degrees (0°) or about zero degrees (0°); 20% bias oriented plies with fibers oriented at an orientation in a range of plus or minus fifty degrees (±50°) to plus or minus seventy-five degrees (±75°), and more preferably at plus or minus sixty-fifty degrees (±65°); and 0% plies with fibers oriented at ninety degrees (90°).

The dense packs 80 are configured to carry all significant box bending in axial tension and compression loads. The dense pack composite ply layup 82 is designed to enable the dense packs 80 to provide all significant continuous bending and axial load paths 28 (see FIG. 1A) across the box structure 12 (see FIG. 1A) and across the transport wing structure 13 (see FIG. 1A) or the stabilizer structures 24 (see FIG. 1A). The dense packs 80 are preferably continuous between the first tip 16 (see FIG. 1A) and the second tip 18 (see FIG. 1A) of the airfoil frame 14 (see FIG. 1A).

The composite material used to make components of the box structure 12, such as the integrated sandwich panels 62, spars 40, and/or stabilizing ribs 48 may comprise known composite materials such as carbon, glass, or polyaramid fibers in woven, non-woven, and braided configurations. In the raw material stage, the fibers may be formed into tapes, filaments, and/or fabric sheets that may be pre-impregnated with uncured resin. The raw materials may be made into components of the box structure 12 by laying them up and/or laminating them onto a tool surface, and then applying heat and pressure to cure the resin and harden the laminate. Examples of additional suitable composite materials that may be used include carbon fiber composite material; carbon fiber reinforced polymer material including carbon fiber reinforced polyphenylene sulfide (PPS), carbon fiber reinforced polyetheretherketone (PEEK), carbon fiber reinforced polyetherketoneketone (PEKK), and carbon fiber reinforced polyethyleneimine (PEI); nylon, or another suitable composite material as will be appreciated by those skilled in the art. The composite material may be in the form of composite tape material, a prepreg unidirectional tape, a prepreg fabric, or another suitable composite material.

Incorporating the box structure 12 into an airfoil frame 14 (see FIG. 1B) of a transport wing structure 13 (see FIG. 1A) allows for a significant reduction in the number of stabilizing ribs 48 (see FIGS. 1B, 2A) disposed between the integrated sandwich panels 62 from the first tip 16 (see FIG. 1B) to the second tip 18 (see FIG. 1B) of the airfoil frame 14 (see FIG. 1B). Preferably, the reduction in the number of stabilizing ribs 48 (see FIGS. 1B, 2A) disposed between the integrated sandwich panels 62 from the first tip 16 (see FIG. 1B) to the second tip 18 (see FIG. 1B) of the airfoil frame 14 (see FIG. 1B) may be in a range of from about 50% to about 90% as compared to airfoil frames without embodiments of the box structure 12 disclosed herein. Each integrated sandwich panel 62 preferably has an increased panel stiffness ratio due to hard, axially stiff dense packs 80 being fully stabilized by the integrated sandwich panel 62 and the spar webs 112. The facesheets 70 of the integrated sandwich panel 62 are preferably soft, and the dense packs 80 of the integrated sandwich panel 62 are preferably hard and axially stiff.

The box structure 12 may further comprise a bonding element 88 (see FIG. 2B) configured for secondarily bonding the plurality of spars 40 and stabilizing ribs 48 to each integrated sandwich panel 62. As shown in FIG. 2B, the spar 40 is secondarily bonded to the integrated sandwich panel 62 with the bonding element 88. In particular, the spar 40 is secondarily bonded to the inner facesheet 74 of the integrated sandwich panel 62 at a joint 96 (see FIG. 2B). Preferably, the bonding element 88 comprises an adhesive material 90 (see FIG. 2B), such as an epoxy, an acrylic, a polyurethane, or another suitable adhesive material as will be appreciated by those skilled in the art.

The box structure 12 may further comprise one or more damage arrestment elements 92 (see FIG. 2B). Preferably, the one or more damage arrestment elements 92 comprise one or more mechanical fasteners 94 (see FIG. 2B), such as bolts, clamps, rivets, or other suitable mechanical fasteners as will be appreciated by those skilled in the art. The one or more damage arrestment elements 92 may be configured for fastening the plurality of stabilizing ribs 48 to each integrated sandwich panel 62, may be configured for fastening the plurality of spars 40 to each integrated sandwich panel 62, or may be are configured for fastening the plurality of spars 40 and the plurality of stabilizing ribs 48 to each integrated sandwich panel 62. As shown in FIG. 2B, the spar 40 is fastened to the integrated sandwich panel 62 with the damage arrestment element 92. In particular, the spar 40 is fastened to the inner facesheet 74 of the integrated sandwich panel 62.

As shown in FIG. 2C, access openings 110 may be positioned at various locations along the lower surface 11b of the box structure 12. Such access openings 110 may be needed to access internal structures such as for manufacture, service, and repair. Preferably, the lower surface 11b may have access openings 110 due to the reduction in the plurality of stabilizing ribs 48 (see FIG. 2A) which allows for an increased internal access. The reduced number of access openings 110 preferably corresponds in number to the reduced number of stabilizing ribs 48. This may result from an increased internal fuel tank access resulting from the reduced number of stabilizing ribs 48.

FIGS. 3A-3E are illustrations of various embodiments of spar configurations for spars 40 that may be used with embodiments of the box structure 12 of the disclosure. FIG. 3A is an illustration of a partial perspective view of one of the embodiments of the box structure 12 of the disclosure having spars 40 with multiple spar configurations, such as, for example, a first spar configuration 40a, a second spar configuration 40b, a third spar configuration 40c, and/or additional suitable spar configurations. FIG. 3A shows the box structure 12 comprising the integrated sandwich panels 62 having facesheets 70 sandwiching one or more core portions 66 and adjacent dense packs 80, and shows the spars 40 each with a web 112 and web attachments 114. The integrated sandwich panels 62 are connected, preferably via bonding, to the spars 40 with the web attachments 114 located at the dense packs 80, the dense packs 80 comprising a type of spar cap 108.

Figure 3B:
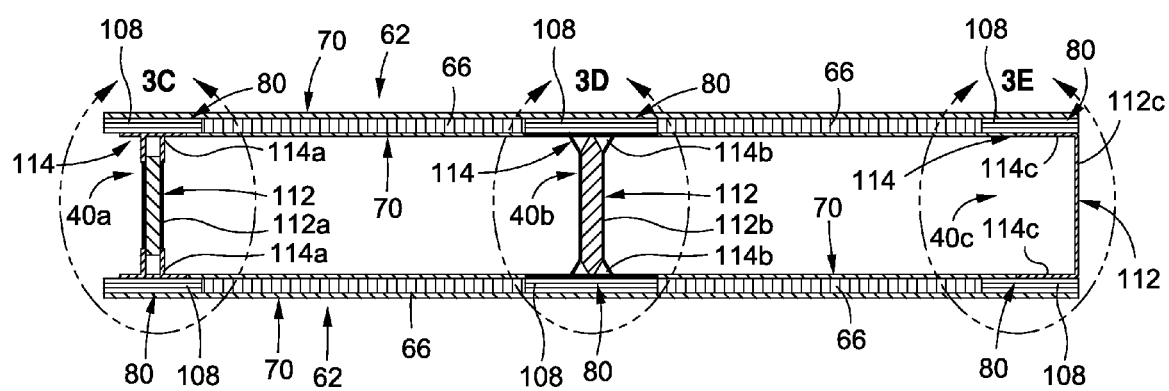
FIG. 3B is an illustration of a cross-sectional view taken along lines 3B-3B of FIG. 3A showing close-up views of multiple spar configurations.

FIG. 3B is an illustration of a cross-sectional view taken along lines 3B-3B of FIG. 3A showing close-up views of the spar configurations 40a, 40b, 40c. As shown in FIG. 3B, the first spar configuration 40a may be in the form of an I-section configuration having a web 112 with web attachments 114. As further shown in FIG. 3B, the web 112 may comprise a web core element 112a, such as a honeycomb core element, to stabilize the web 112. As further shown in FIG. 3B, the web attachments 114 may comprise web attachment flanges 114a. The web attachment flanges 114a are preferably attached to the dense packs 80 of the integrated sandwich panels 62.

Figure 3C:
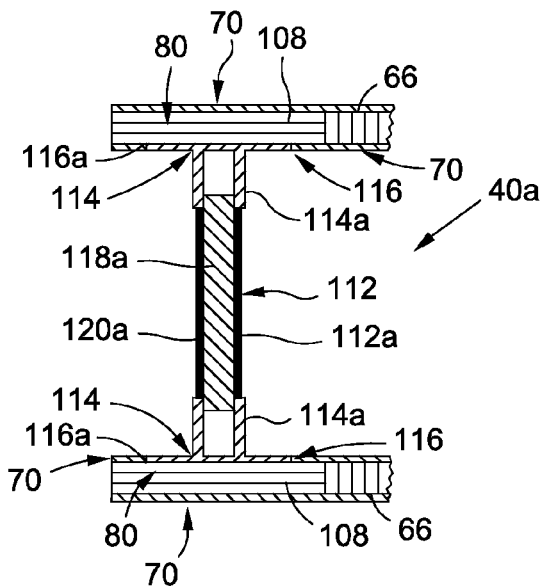
FIG. 3C is an illustration of a close-up cross-sectional view of circle 3C of FIG. 3B.

FIG. 3C is an illustration of a close-up cross-sectional view of circle 3C of FIG. 3B. As shown in FIG. 3C, the web attachments 114, such as in the form of web attachment flanges 114a, of the first spar configuration 40a, may be bonded to the dense packs 80 (comprising a type of spar cap 108) via a bonding element 116 forming bond lines 116a between the web attachment flanges 114a and the dense packs 80. FIG. 3C further shows the facesheets 70 and core portions 66 adjacent the dense packs 80. The web 112, such as in the form of the web core element 112a, may further comprise a web sandwich construction 118a with one or more web facesheets 120a sandwiching the web core element 112a.

As further shown in FIG. 3B, a second spar configuration 40b may be in the form of an I-section configuration having a web 112 with web attachments 114. As further shown in FIG. 3B, the web 112 may comprise a web core element 112b, such as a honeycomb core element, to stabilize the web 112. As further shown in FIG. 3B, the web attachments 114 may comprise web attachment noodle flanges 114b. The web attachment noodle flanges 114b are preferably attached to the dense packs 80 of the integrated sandwich panels 62.

Figure 3D:
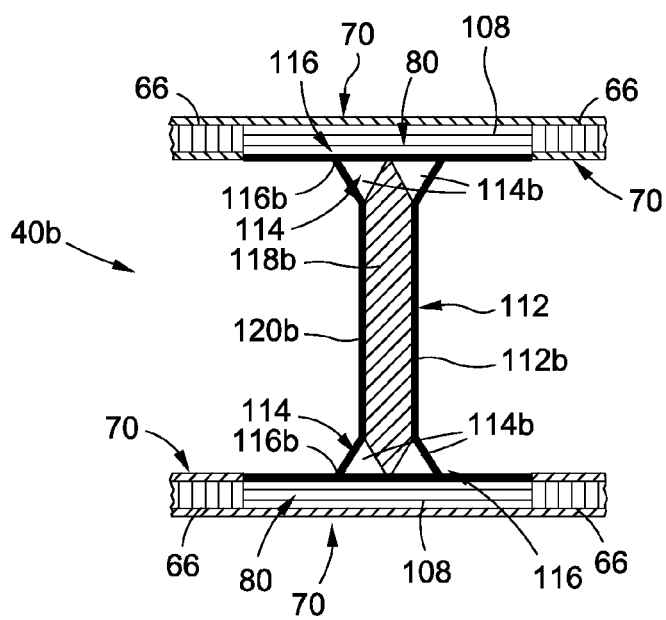
FIG. 3D is an illustration of a close-up cross-sectional view of circle 3D of FIG. 3B.

FIG. 3D is an illustration of a close-up cross-sectional view of circle 3D of FIG. 3B. As shown in FIG. 3D, the web attachments 114, such as in the form of web attachment noodle flanges 114b, of the second spar configuration 40b may be bonded to the dense packs 80 (comprising a type of spar cap 108) via a bonding element 116 forming bond lines 116b between the web attachment noodle flanges 114b and the dense packs 80. FIG. 3D further shows the facesheets 70 and core portions 66 adjacent the dense packs 80. The web 112, such as in the form of the web core element 112b, may further comprise a web sandwich construction 118b with one or more web facesheets 120b sandwiching the web core element 112b.

As further shown in FIG. 3B, a third spar configuration 40c may be in the form of a C-section configuration having a web 120 with web attachments 114. As further shown in FIG. 3B, the web 112 may comprise a web body element 112c. As further shown in FIG. 3B, the web attachments 114 may comprise web attachment ends 114c. The web attachment ends 114c are preferably attached to the dense packs 80 of the integrated sandwich panels 62.

Figure 3E:
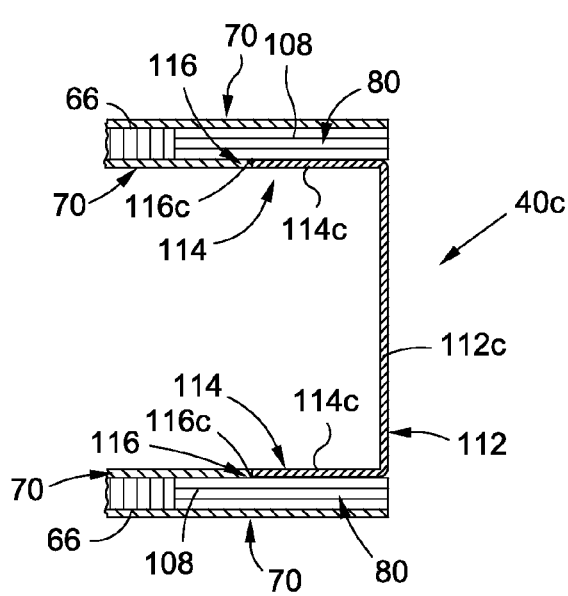
FIG. 3E is an illustration of a close-up cross-sectional view of circle 3E of FIG. 3B.

FIG. 3E is an illustration of a close-up cross-sectional view of circle 3E of FIG. 3B. As shown in FIG. 3E, the web attachments 114, such as in the form of web attachment ends 114c, of the third spar configuration 40c may be bonded to the dense packs 80 (comprising a type of spar cap 108) via a bonding element 116 forming bond lines 116c between the web attachment ends 114c and the dense packs 80. FIG. 3E further shows the facesheets 70 and core portions 66 adjacent the dense packs 80.

As discussed above, for the integrated sandwich panels 62, the plurality of dense packs 80 may be integrated with and bonded to the facesheets 70 that sandwich the one or more core portions 66 (see FIG. 3A) and the adjacent dense packs 80 (see FIG. 3A). FIGS. 4-10 are illustrations of various embodiments of spar closeout joints joining the spar 40 to the dense pack 80 and that may be used with embodiments of the box structure 12 of the disclosure.

Figure 4:
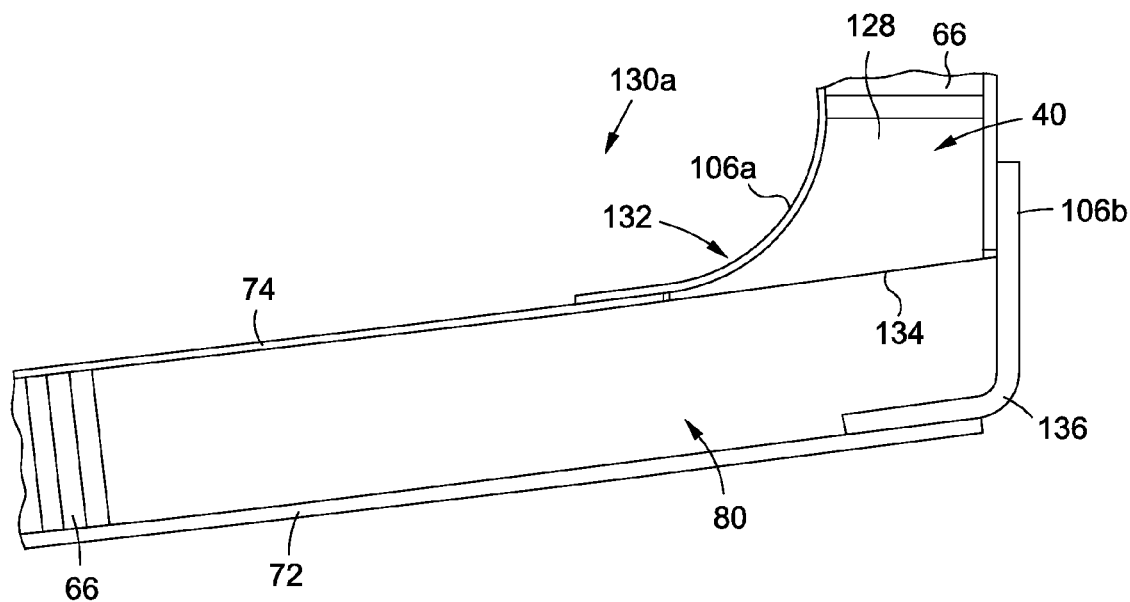
FIGS. 4-10 are illustrations of various embodiments of spar closeout joints that may be used with embodiments of the box structure of the disclosure.

FIG. 4 is an illustration of a partial sectional view of a first embodiment of a spar closeout joint 130a of the disclosure. FIG. 4 shows the dense pack 80, the outer facesheet 72, the inner facesheet 74, and the core portions 66. FIG. 4 further shows a filler portion 128, such as a soft laminate, of the spar 40 with a first spar closeout attach angle 106a and a second spar closeout attach angle 106b. The spar closeout joint 130a shown in FIG. 4 is located at an inner portion 132 and joins the filler portion 128 of the spar 40 to the dense pack 80 at a bond line 134 along the inner facesheet 74. The spar closeout joint 130a uses a separate angle 136 to act as a forward location stop for the filler portion 128 of the spar 40 during assembly. This embodiment may have the advantageous feature of allowing for the spar 40 to be self-locating.

Figure 5:
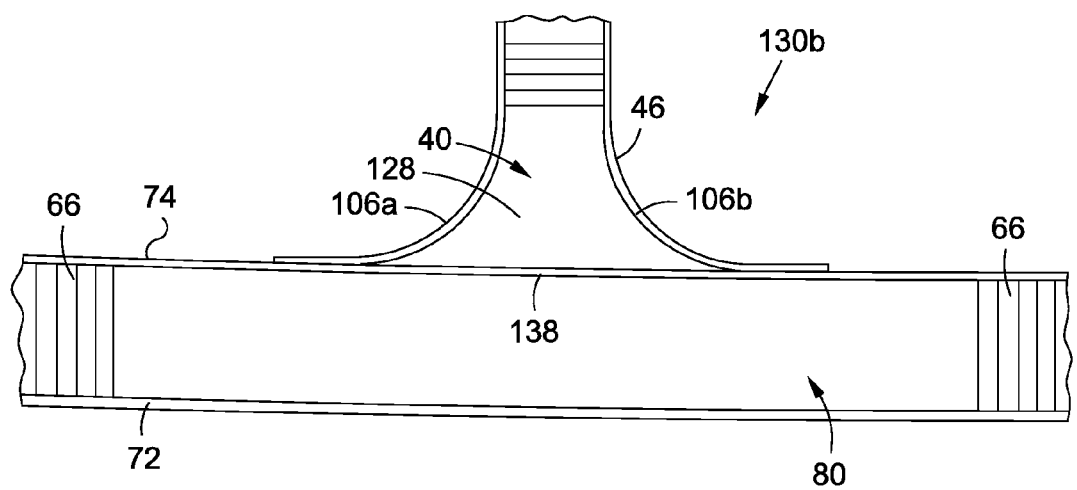

FIG. 5 is an illustration of a partial sectional view of a second embodiment of a spar closeout joint 130b of the disclosure. FIG. 5 shows the dense pack 80, the outer facesheet 72, the inner facesheet 74, and the core portions 66. FIG. 5 further shows the filler portion 128, such as a soft laminate, of the spar 40, where the spar 40 is in the form of intermediate spar 46. FIG. 5 further shows the first spar closeout attach angle 106a and the second spar closeout attach angle 106b. The spar closeout joint 130b shown in FIG. 5 is attached at a center portion 138 on the dense pack 80. This embodiment may have the advantageous feature of centering the filler portion 128 of the spar 40 on the dense pack 80 which may reduce reaction loads in the outer facesheet 72 and the inner facesheet 74 due to any out of plane movement of the dense pack 80.

Figure 6:
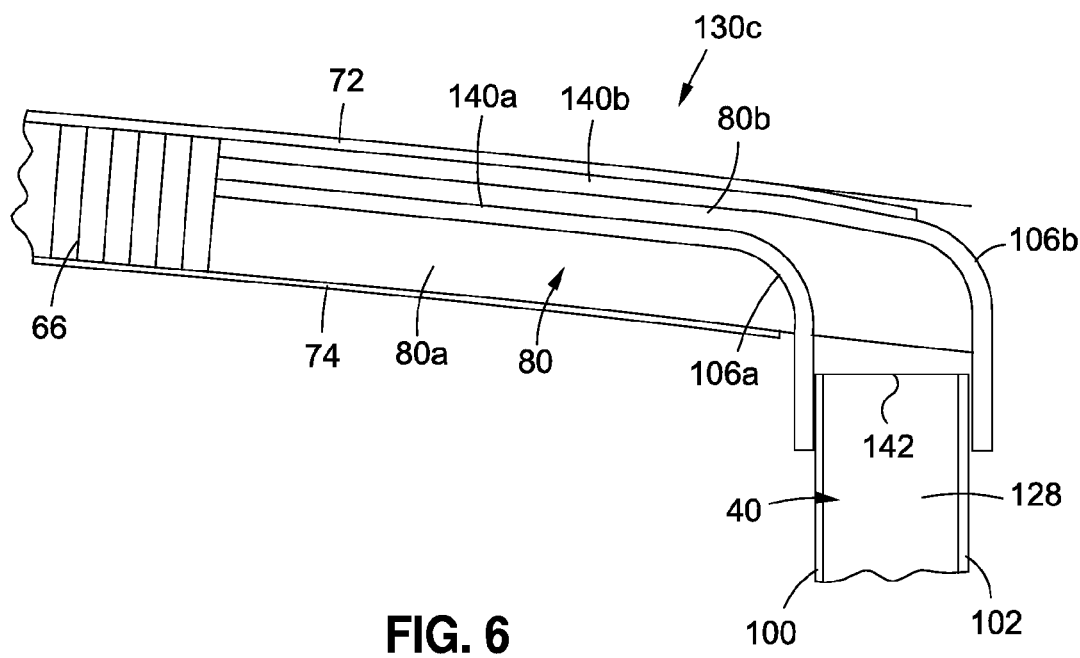

FIG. 6 is an illustration of a partial sectional view of a third embodiment of a spar closeout joint 130c of the disclosure. FIG. 6 shows the dense pack 80 split into dense pack sections 80a, 80b and shows the outer facesheet 72, the inner facesheet 74, and the core portion 66. FIG. 6 further shows the filler portion 128, such as a soft laminate, of the spar 40 having a square edge 142 and having a sandwich configuration comprising a first spar facesheet 100 and a second spar facesheet 102. The spar closeout joint 130c shown in FIG. 6 is a split dense pack type and has the first spar closeout attach angle 106a and the second spar closeout attach angle 106b contained within the dense pack 108 at dense pack portions 140a, 140b, respectively. In addition, the first spar closeout attach angle 106*a* and the second spar closeout attach angle 106*b* may be tapered and need not be a full length. Preferably, the first spar closeout attach angle 106*a* is as close to the inner facesheet 74 as possible. This embodiment may have the advantageous feature of facilitating load redistribution.

Figure 7:
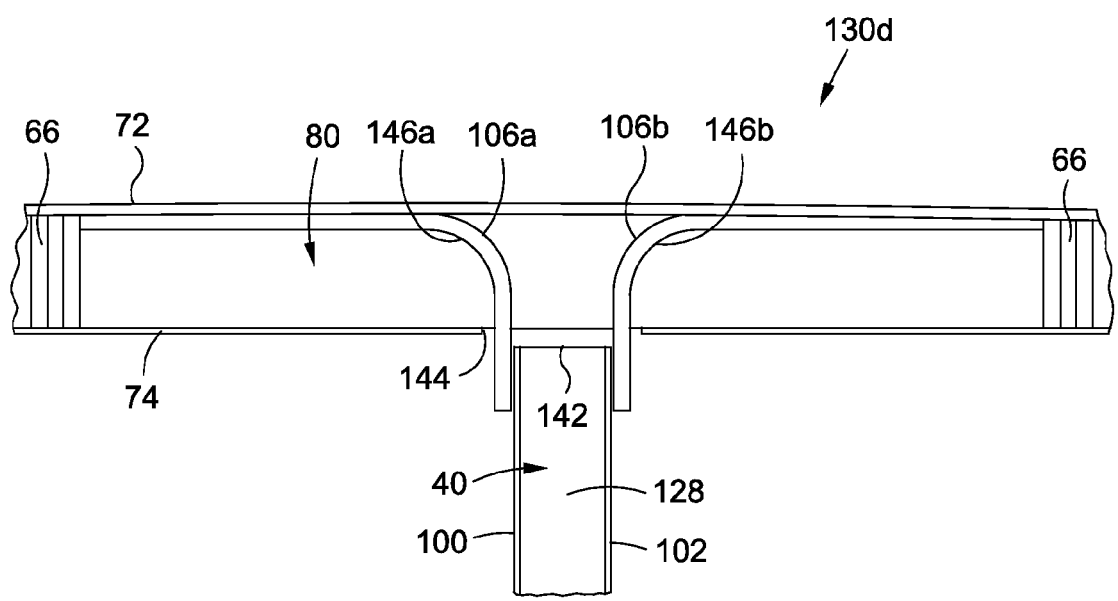

FIG. 7 is an illustration of a partial sectional view of a fourth embodiment of a spar closeout joint 130*d* of the disclosure. FIG. 7 shows the dense pack 80, the outer facesheet 72, the inner facesheet 74 with a discontinuous portion 144, and the core portions 66. FIG. 7 further shows the filler portion 128, such as a soft laminate, of the spar 40 having a square edge 142 and having the first spar closeout attach angle 106*a* and the second spar closeout attach angle 106*b*. The spar closeout joint 130*d* shown in FIG. 7 is a split dense pack type and is centered on the dense pack 80. As shown in FIG. 7, the first spar closeout attach angle 106*a* is attached and centered on the dense pack 80 at central attachment portion 146*a* and the second spar closeout attach angle 106*b* is attached and centered on the dense pack 80 at central attachment portion 146*b*. This embodiment may have the advantageous feature of allowing for support of the spar closeout attach angles 106*a*, 106*b*.

Figure 8:
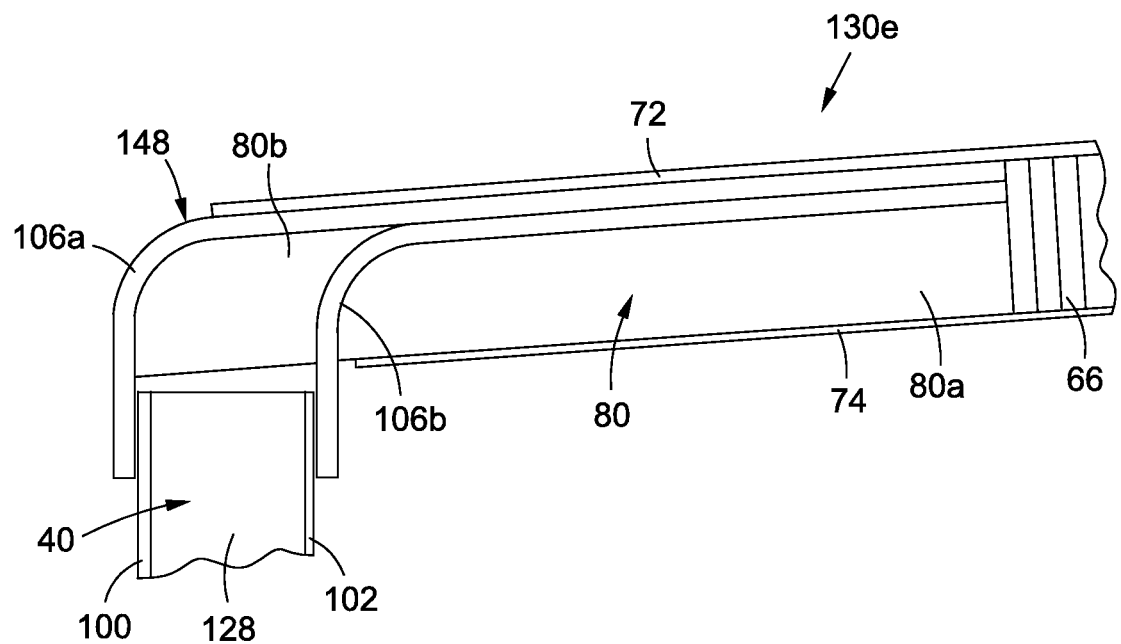

FIG. 8 is an illustration of a partial sectional view of a fifth embodiment of a spar closeout joint 130*e* of the disclosure. FIG. 8 shows the dense pack 80 split into dense pack sections 80*a*, 80*b* and shows the outer facesheet 72, the inner facesheet 74, and the core portion 66. FIG. 8 further shows the filler portion 128, such as a soft laminate, of the spar 40 having a first spar facesheet 100 and a second spar facesheet 102. The spar closeout joint 130*e* shown in FIG. 8 is a split dense pack type and has the first spar closeout attach angle 106*a* and the second spar closeout attach angle 106*b* together on the outside at an outer portion 148. This embodiment may have the advantageous features of having a simple, less complex, two-piece dense pack design.

Figure 9:
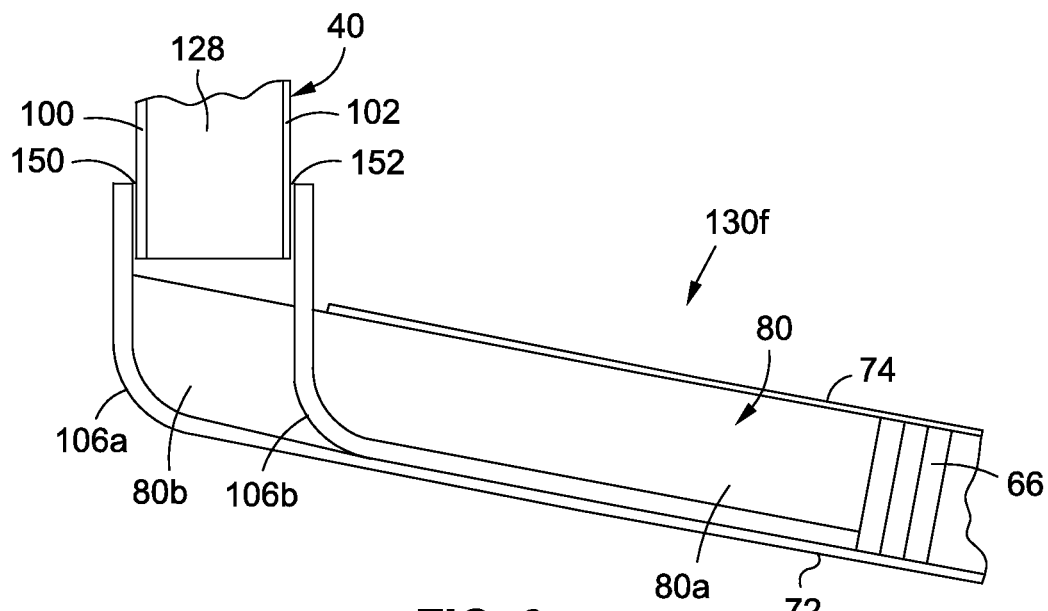

FIG. 9 is an illustration of a partial sectional view of a sixth embodiment of a spar closeout joint 130*f* of the disclosure. FIG. 9 shows the dense pack 80 split into dense pack sections 80*a*, 80*b* and shows the outer facesheet 72, the inner facesheet 74, and the core portion 66. FIG. 9 further shows the filler portion 128, such as a soft laminate, of the spar 40 having a first spar facesheet 100 and a second spar facesheet 102. The spar closeout joint 130*f* shown in FIG. 9 is a split dense pack type and the first spar closeout attach angle 106*a* is formed by the outer facesheet 72 and attaches at a first outside attach portion 150. The second spar closeout attach angle 106*b* remains separate and attaches at a second outside attach portion 152. This embodiment may have the advantageous features of having a reduced part count since only one separate spar closeout attach angle is needed and also having a simple, less complex, two-piece dense pack design.

Figure 10:
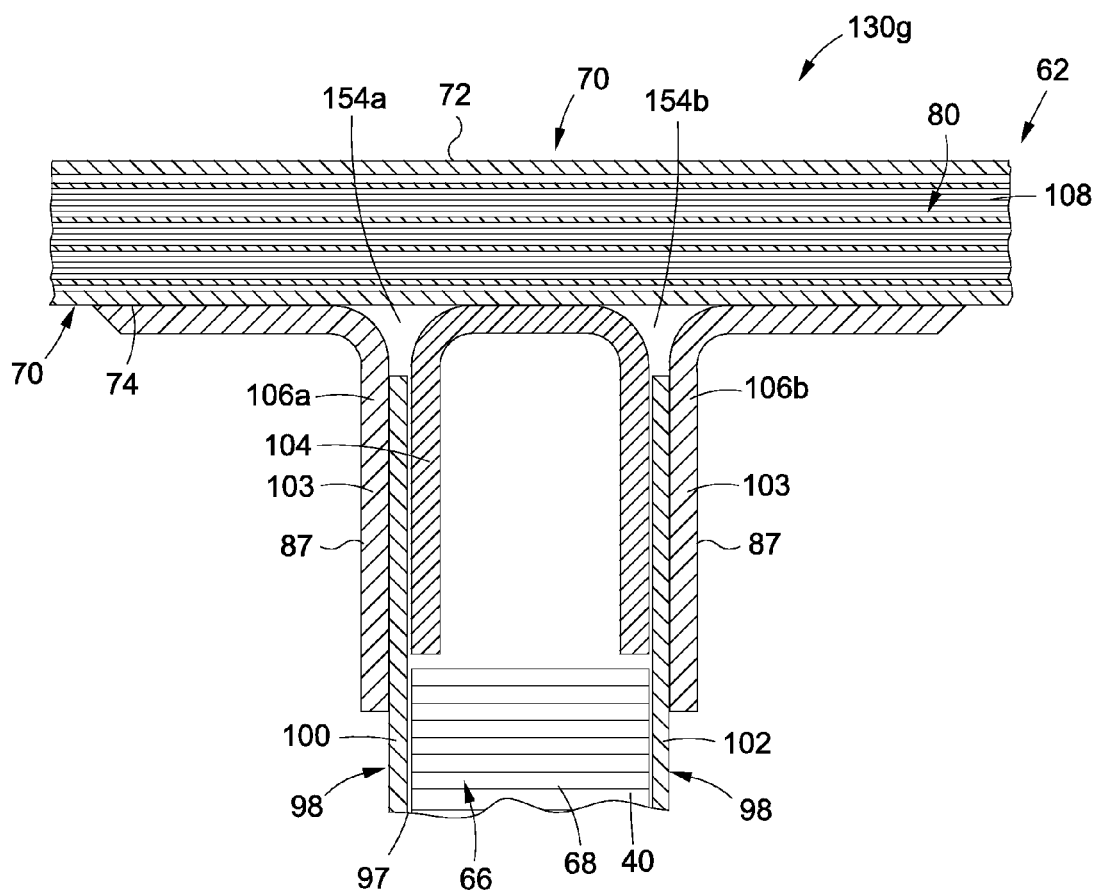

FIG. 10 is an illustration of a partial cross-sectional view of a seventh embodiment of a spar closeout joint 130*g* of the disclosure. FIG. 10 shows the integrated sandwich panel 62 having facesheets 70, preferably composite skin facesheets, such as in the form of outer facesheet 72 and inner facesheet 74, sandwiching the dense pack 80, where the dense pack 80 comprises a type of spar cap 108. FIG. 10 further shows the spar 40 having a spar sandwich construction 97 comprising a core portion 66, such as a honeycomb core 68, sandwiched between at least two spar facesheets 98, such as in the form of first spar facesheet 100 and second spar facesheet 102. As shown in FIG. 10, each spar facesheet 98 may preferably have a spar facesheet composite ply layup 103 comprised of a substantially quasi-isotropic composite tape laminate 87. As further shown in FIG. 10, the spar closeout joint 130*g* has the first spar closeout attach angle 106*a* attached to the first spar facesheet 100 and also attached to the inner facesheet 74. As further shown in FIG. 10, the spar closeout joint 130*g* has the second spar closeout attach angle 106*b* attached to the second spar facesheet 102 and also attached to the inner facesheet 74. As further shown in FIG. 10, a spar closeout channel 104 is positioned between and attached to the first spar facesheet 100, the second spar facesheet 102, and the inner facesheet 74. Gap portions 154*a*, 154*b* between the spar closeout channel 104 and the inner facesheet 74 may be formed and may be filled with adhesive at some point during manufacture of the box structure 12 or component part of which the box structure 12 will be incorporated into. This embodiment may have the advantageous feature of having the spar 40 constructed with a spar sandwich construction 97 that helps stabilize the spar 40 as well as the dense pack 80.

In another embodiment of the disclosure, there is provided an air vehicle 10 (see FIG. 1A) having a bonded box structure 12 (see FIG. 1A) for carrying load. The air vehicle 10 comprises an airfoil frame 14 (see FIG. 1A) having a first tip 16 (see FIG. 1A) and a second tip 18 (see FIG. 1A). The air vehicle 10 further comprises a bonded box structure 12 attached to the airfoil frame 14. The bonded box structure 12 comprises upper and lower composite integrated sandwich panels 62 (see FIG. 2B) continuous from the first tip 16 to the second tip 18 of the airfoil frame 14. The integrated sandwich panels 62 have facesheets 70 (see FIG. 2B) sandwiching one or more core portions 66 (see FIG. 2B) and adjacent dense packs 80 (see FIG. 2B) oriented in an axial direction. Each of the integrated sandwich panels 62 preferably has an increased panel stiffness ratio due to hard, axially stiff dense packs 80 being fully stabilized by the integrated sandwich panel 62 and the spar webs 112.

The bonded box structure 12 further comprises a plurality of spars 40 (see FIG. 3A). As shown in FIG. 3A, each spar 40 comprises a web 112 and web attachments 114 and each spar 40 has a spar length in the axial direction. As further shown in FIG. 3A, the plurality of spars 40 are preferably connected to the integrated sandwich panels 62 with the web attachments 114 located at the dense packs 80. The facesheets 70 are configured to carry primarily torsion and pressure loads in shear and no significant axial loads. The facesheets 70 each have a facesheet composite ply layup 76 substantially comprised of bias oriented plies 86 (see FIG. 2B), and preferably bias oriented plies 86 with fibers oriented at plus or minus forty-five degrees (±45°). The facesheet composite ply layup 76 is designed to enable the facesheets 70 to provide primarily continuous torsion, shear, and pressure load paths.

The dense packs 80 are configured to carry all significant box bending in axial tension and compression loads. The dense packs 80 preferably each have a dense pack composite ply layup 82 (see FIG. 2B) comprising a substantially orthogonal, unidirectional composite tape laminate comprised of unidirectional plies 85 (see FIG. 2B) oriented at zero degrees (0°) or about zero degrees (0°). The dense pack composite ply layup 82 is designed to enable the dense packs 80 to provide all significant continuous bending and axial load paths.

As shown in FIG. 1B, the bonded box structure 12 of the air vehicle 10 (see FIG. 1A) may further comprise a plurality of stabilizing ribs 48 bonded to and disposed between the integrated sandwich panels 62 from the first tip 16 to the second tip 18 of the airfoil frame 14. As further shown in FIG. 1B, the plurality of spars 40 preferably comprises a front spar 42, a rear spar 44, and an intermediate spar 46.

In another embodiment of the disclosure, there is provided a transport wing structure 13 (see FIG. 1A) or a stabilizer structure 24 (see FIG. 1A) for an air vehicle 10 (see FIG. 1A)

such as an aircraft. The transport wing structure 13 preferably comprises an airfoil frame 14 (see FIG. 1A) having a first tip 16 (see FIG. 1A) and a second tip 18 (see FIG. 1A). The stabilizer structure 24 preferably comprises an airfoil frame 14a (see FIG. 1) having a first tip 16a (see FIG. 1A) and a second tip 18a (see FIG. 1A). The transport wing structure 13 further comprises a transport wing box 12a (see FIG. 1A) attached to the airfoil frame 14. The stabilizer structure 24 further comprises a stabilizer box structure 12b (see FIG. 1A) attached to the airfoil frame 14a.

The transport wing box 12a or the stabilizer box structure 12b comprises a pair of integrated sandwich panels 62 (see FIG. 1B) continuous from the first tip 16, 16a to the second tip 18, 18a of the airfoil frame 14, 14a. As shown in FIG. 2B, and as discussed above, each of the integrated sandwich panels 62 comprises facesheets 70 (see FIG. 2B), such as composite skin facesheets, sandwiching one or more core portions 66 and adjacent dense packs 80 oriented in an axial direction. As discussed in detail above and shown in FIG. 2B, in one embodiment, each facesheet 70 has a facesheet composite ply layup 76 substantially comprised of bias oriented plies 86, and preferably bias oriented plies 86 with fibers oriented at plus or minus forty-five degrees (±45°) or about plus or minus forty-five degrees (±45°). In another embodiment, more preferably, the facesheet composite ply layup 76 may comprise 70%-80% bias oriented plies 86 with fibers oriented at plus or minus forty-five degrees (±45°) or about plus or minus forty-five degrees (±45°); 10%-20% plies with fibers oriented at ninety degrees (90°) or about ninety degrees (90°); and 0%-20% unidirectional plies 85 (see FIG. 2B) with unidirectional fibers oriented at zero degrees (0°) or about zero degrees (0°). Most preferably, the facesheet composite ply layup 76 may comprise 80% bias oriented plies 86 with fibers oriented at plus or minus forty-five degrees (+45°) or about plus or minus forty-five degrees (+45°); 10% plies with fibers oriented at ninety degrees (90°) or about ninety degrees (90°); and 10% unidirectional plies 85 with unidirectional fibers oriented at zero degrees (0°) or about zero degrees (0°). The facesheets 70 are configured to carry primarily torsion and pressure loads in shear and no significant axial loads. The facesheet composite ply layup 76 is preferably designed to enable the facesheets 70 to provide only continuous torsion, shear, and pressure load paths 28 (see FIG. 1A) across the box structure 12 and across the transport wing structure 13 or the stabilizer structure 24.

Each integrated sandwich panel 62 further comprises dense packs 80 adjacent to the one or more core portions 66 and joined to, preferably by bonding, and integrated with the facesheets 70. As discussed in detail above and shown in FIG. 2B, in one embodiment, each dense pack 80 preferably has a dense pack composite ply layup 82 comprised of a substantially orthogonal, unidirectional composite tape laminate 84 comprised of unidirectional plies 85 with unidirectional fibers oriented at zero degrees (0°) or about zero degrees (0°). As used herein "about zero degrees (0°)" means a range from zero degrees (0°) to ten degrees (10°). In another embodiment, more preferably, the dense pack composite ply layup 82 may comprise 70%-100% substantially orthogonal, unidirectional composite tape laminate 84 comprised of unidirectional plies 85 with unidirectional fibers oriented at zero degrees (0°) or about zero degrees (0°); 0%-25% bias oriented plies 86 with fibers oriented at an orientation in a range of plus or minus fifty degrees (±50°) to plus or minus seventy-five degrees (±75°), and more preferably at plus or minus sixty-fifty degrees (±65°); and 0%-10% plies with fibers oriented at ninety degrees (90°). Most preferably, the dense pack composite ply layup 82 may comprise 80% substantially orthogonal unidirectional plies with unidirectional fibers oriented at zero degrees (0°) or about zero degrees (0°); 20% bias oriented plies with fibers oriented at an orientation in a range of plus or minus fifty degrees (±50°) to plus or minus seventy-five degrees (±75°), and more preferably at plus or minus sixty-fifty degrees (±65°); and 0% plies with fibers oriented at ninety degrees) (90°). The dense packs 80 are configured to carry all significant box bending in axial tension and compression loads. The dense pack composite ply layup 82 is designed to enable the dense packs 80 to provide continuous bending and axial load paths 28 (see FIG. 1A) across the box structure 12 and across the transport wing structure 13 or the stabilizer structure 24, and preferably to provide all significant continuous bending and axial load paths 28. The dense packs 80 are preferably continuous between the first tip 16 (see FIG. 1A) and the second tip 18 (see FIG. 1A) of the airfoil frame 14 (see FIG. 1A).

As shown in FIGS. 1B, 2A, the transport wing box 12a or the stabilizer box structure 12b further comprises a plurality of spars 40 and stabilizing ribs 48 preferably bonded to and disposed between the pair of integrated sandwich panels 62 from the first tip 16, 16a to the second tip 18, 18a of the airfoil frame 14, 14a. As shown in FIG. 1B, the plurality of spars 40 preferably comprise a front spar 42, a rear spar 44, and an intermediate spar 46. Each integrated sandwich panel 62 is preferably stabilized with a sandwich construction and each preferably has an increased panel stiffness ratio due to hard, axially stiff dense packs 80 being fully stabilized by the integrated sandwich panel 62 and the spar webs 112. Preferably, the facesheets 70 are soft, and the dense packs 80 are hard and axially stiff.

Each of the plurality of spars 40 may have a spar sandwich construction 97 (see FIG. 10), as discussed in detail above. The aircraft wing 12a or stabilizer box structure 12b may further comprise one or more damage arrestment elements 92 (see FIG. 2B). The one or more damage arrestment elements 92 may comprise one or more mechanical fasteners 94. The one or more damage arrestment elements 92 may be configured for fastening the plurality of stabilizing ribs 48 to each integrated sandwich panel 62, may be configured for fastening the plurality of spars 40 to each integrated sandwich panel 62, or may be configured for fastening the plurality of spars 40 and the plurality of stabilizing ribs 48 to each integrated sandwich panel 62.

Figure 11:
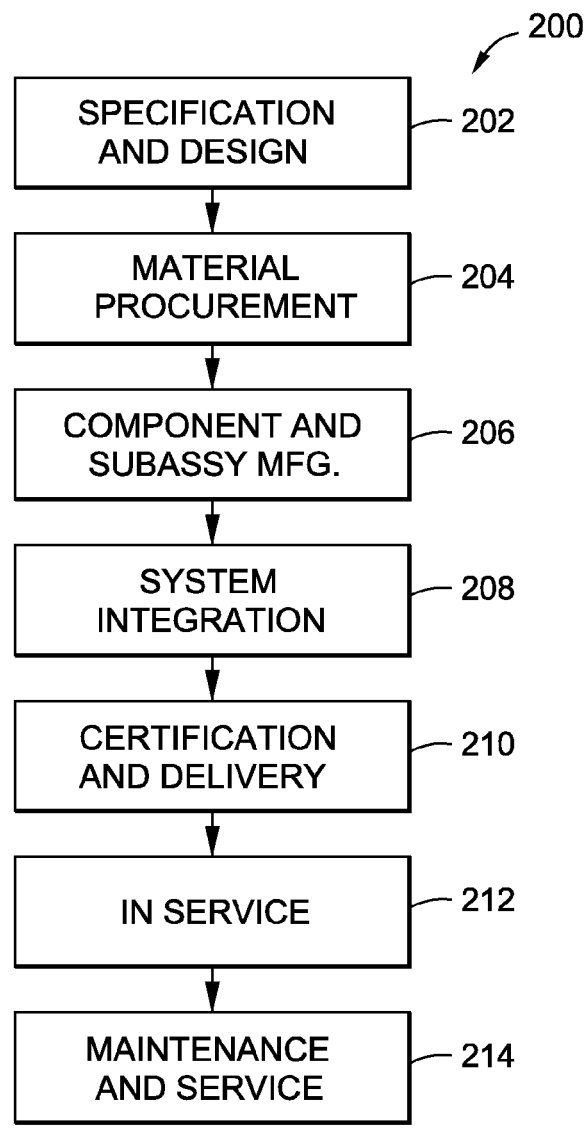
FIG. 11 is an illustration of a flow diagram of an aircraft production and service method.
Figure 12:
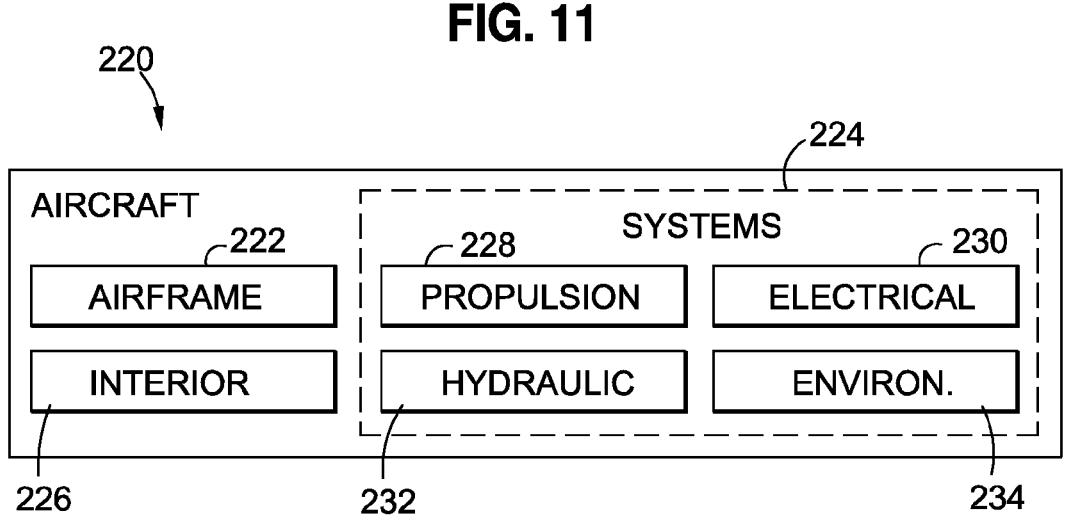
FIG. 12 is an illustration of a block diagram of an aircraft.

FIG. 11 is an illustration of a flow diagram of an embodiment of an aircraft manufacturing and service method 200 of the disclosure. FIG. 12 is an illustration of a functional block diagram of an aircraft 220. Referring to FIGS. 11-12, embodiments of the disclosure may be described in the context of the aircraft manufacturing and service method 200, as shown in FIG. 11, and the aircraft 220, as shown in FIG. 12. During pre-production, the exemplary aircraft manufacturing and service method 200 may include specification and design 202 of the aircraft 220 and material procurement 204. During production, component and subassembly manufacturing 206 and system integration 208 of the aircraft 220 takes place. Thereafter, the aircraft 220 may go through certification and delivery 210 in order to be placed in service 212. While in service 212 by a customer, the aircraft 220 is scheduled for routine maintenance and service 214 (which may also include modification, reconfiguration, refurbishment, and so on).

Each of the processes of the aircraft manufacturing and service method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 220 produced by the exemplary aircraft manufacturing and service method 200 may include an airframe 222 with a plurality of high-level systems 224 and an interior 226. Examples of high-level systems 224 may include one or more of a propulsion system 228, an electrical system 230, a hydraulic system 232, and an environmental system 234. Any number of other systems may be included. Although an aerospace example is shown, the principles of the invention may be applied to other industries, such as the automotive industry.

Methods and structured embodied herein may be employed during any one or more of the stages of the aircraft manufacturing and service method 200. For example, components or subassemblies corresponding to component and subassembly manufacturing 206 may be fabricated or manufactured in a manner similar to components or subassemblies produced while the aircraft 220 is in service 212. Also, one or more apparatus embodiments, method embodiments, or a combination thereof may be utilized during the component and subassembly manufacturing 206 and system integration 208, for example, by substantially expediting assembly of or reducing the cost of an aircraft 220. Similarly, one or more of apparatus embodiments, method embodiments, or a combination thereof may be utilized while the aircraft 220 is in service 212, for example and without limitation, to routine maintenance and service 214.

Figure 13:
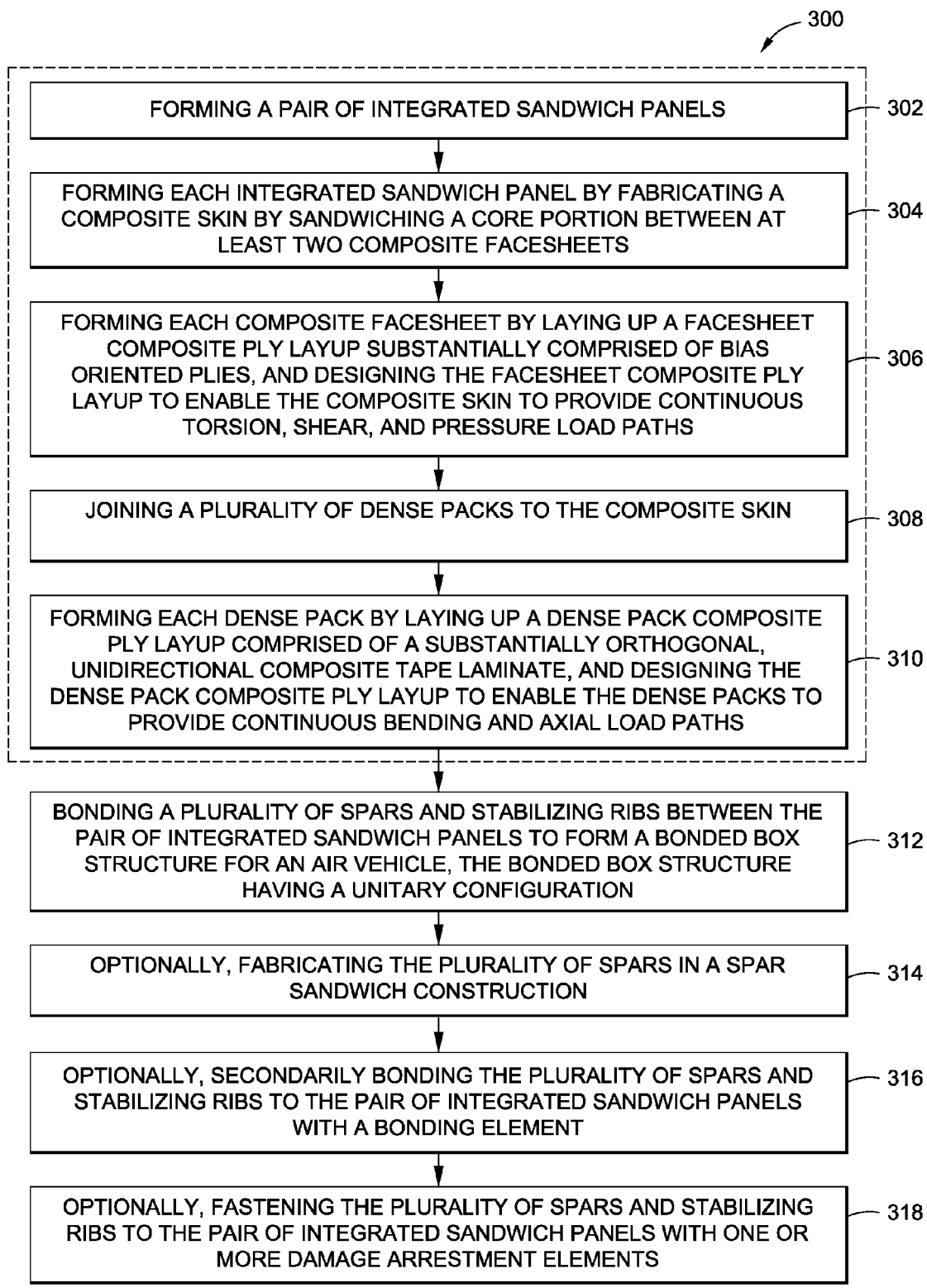
FIG. 13 is an illustration of a flow diagram illustrating an embodiment of a method of the disclosure.

In another embodiment of the disclosure, there is provided a method 300 of making a bonded box structure 12 (see FIG. 1A) for an air vehicle 10 (see FIG. 1A). FIG. 13 is an illustration of a flow diagram illustrating an embodiment of the method 300 of the disclosure. As shown in FIG. 13, the method 300 comprises step 302 of forming a pair of integrated sandwich panels 62 (see FIG. 2B). As shown in FIG. 13, the method 300 further comprises step 304 of forming each integrated sandwich panel 62 by fabricating a composite skin 64 (see FIG. 2B) by sandwiching a core portion 66 (see FIG. 2B) between at least two facesheets 70 (see FIG. 2B). Preferably, the facesheets 70 are composite skin facesheets.

As shown in FIG. 13, the method 300 further comprises step 306 of forming each facesheet 70, such as in the form of a composite skin facesheet, by laying up a facesheet composite ply layup 76 (see FIG. 2B) substantially comprised of bias oriented plies 86 (see FIG. 2B), and preferably bias oriented plies 86 with fibers oriented at plus or minus forty-five degrees (±45°) or about plus or minus forty-five degrees (±45°), and designing the facesheet composite ply layup 76 to enable the composite skin 64 to provide continuous torsion, shear, and pressure load paths 28 (see FIG. 1A) across the bonded box structure 12. The step 306 of forming each facesheet 70, such as in the form of a composite skin facesheet, preferably further comprises laying up the facesheet composite ply layup 76 comprising 70%-80% bias oriented plies 86 (see FIG. 2B) with fibers oriented at plus or minus forty-five degrees (±45°) or about plus or minus forty-five degrees (±45°); 10%-20% plies with fibers oriented at ninety degrees (90°) or about ninety degrees (90°); and 0%-20% unidirectional plies 85 (see FIG. 2B) with unidirectional fibers oriented at zero degrees (0°) or about zero degrees (0°).

As shown in FIG. 13, the method 300 further comprises forming each integrated sandwich panel 62 with step 308 of joining a plurality of dense packs 80 (see FIG. 2B) to the composite skin 64. As shown in FIG. 13, the method 300 further comprises step 310 of forming each dense pack 80 by laying up a dense pack composite ply layup 82 (see FIG. 2B) comprised of a substantially orthogonal, unidirectional composite tape laminate 84 (see FIG. 2B), and designing the dense pack composite ply layup 82 to enable the dense packs 80 to provide continuous bending and axial load paths 28 (see FIG. 1A) across the bonded box structure 12, and preferably to provide all significant continuous bending and axial load paths 28 across the bonded box structure 12. The step 310 of forming each dense pack 80 preferably further comprises laying up the dense pack composite ply layup 82 comprising 70%-100% substantially orthogonal, unidirectional plies 85 (see FIG. 2B) with unidirectional fibers oriented at zero degrees (0°) or about zero degrees (0°); 0%-25% bias oriented plies 86 (see FIG. 2B) with fibers oriented at an orientation in a range of plus or minus fifty degrees (±50°) to plus or minus seventy-five degrees (±75°); and 0%-10% plies with fibers oriented at ninety degrees (90°).

As shown in FIG. 13, the method 300 further comprises step 312 of bonding a plurality of spars 40 (see FIG. 2A) and stabilizing ribs 48 (see FIG. 2A) between the pair of integrated sandwich panels 62 to form a bonded box structure 12 for an air vehicle 10 (see FIG. 1A). The bonded box structure 12 preferably has a unitary configuration 26 (see FIG. 1). The pair of integrated sandwich panels 62 are preferably continuous from the first tip 16 (see FIG. 1A) to the second tip 18 (see FIG. 1A) of an airfoil frame 14 (see FIG. 1A) to which the bonded box structure 12 is attached to the air vehicle 10. The step 312 of bonding the plurality of spars 40 (see FIG. 2A) and stabilizing ribs 48 between the pair of integrated sandwich panels 62 may further comprise forming one or more spar closeout joints 130a-130g (see FIGS. 4-10) to bond the plurality of spars 40 to a spar cap 80 (see FIGS. 4-10) of each integrated sandwich panel 62.

As shown in FIG. 13, the method 300 may further comprise the optional step 314 of fabricating the plurality of spars 40 with a spar sandwich construction 97 (see FIG. 10). The spar sandwich construction 97 may be formed by sandwiching a core portion 66 (see FIG. 10) between at least two spar facesheets 98 (see FIG. 10), each spar facesheet 98 formed by laying up a spar facesheet composite ply layup 103 (see FIG. 10) comprised of a substantially quasi-isotropic composite tape laminate 87 (see FIG. 10). The method 300 may further comprise the optional step of fabricating the plurality of stabilizing ribs 48 in a sandwich construction similar to the spar sandwich construction 97 (see FIG. 10) by sandwiching a core portion 66 (see FIG. 10) between at least two facesheets, such as rib facesheets (not shown), where each rib facesheet may be formed by laying up a rib facesheet composite ply layup (not shown) comprised of a substantially quasi-isotropic composite tape laminate similar to the substantially quasi-isotropic composite tape laminate 87 (see FIG. 10) of the spar facesheet composite ply layup 103 (see FIG. 10) of the plurality of spars 40.

As shown in FIG. 13, the method 300 may further comprise the optional step 316 of secondarily bonding the plurality of spars 40 and stabilizing ribs 48 to the pair of integrated sandwich panels 62 with a bonding element 88 (see FIG. 2B). The bonding element 88 preferably comprises an adhesive material 90 (see FIG. 2B) or another suitable bonding element.

As shown in FIG. 13, the method 300 may further comprise the optional step 316 of fastening the plurality of spars 40 and stabilizing ribs 48 to each integrated sandwich panel 62 with one or more damage arrestment elements 92 (see FIG. 2B). The damage arrestment elements 92 preferably comprise one or more mechanical fasteners 94 (see FIG. 2B). The method 300 may further comprise reducing a number of fasteners 156 (see FIG. 1A) on the bonded box structure 12 by positioning the fasteners 156 outside of a box structure boundary 158 (see FIG. 1A), thus resulting in reduced lightning strike risk to the bonded box structure 12.

Disclosed embodiments of the box structure 12, such as a bonded box structure, and method 300 of making the same, may provide, as compared to existing wing box structures and methods, significant reductions in part count, manufacturing costs, weight, and flow-time. A reduction in weight may allow for an increase in aircraft performance which may result in less fuel required for a given flight profile. Using less fuel may reduce operating costs and may have less impact on the environment by reducing the carbon footprint of the transport. A reduction in flow-time may allow for an increased throughput and a reduced cost of inventory.

In addition, disclosed embodiments of the box structure 12 and method 300 of making the same, provide a tip-to-tip transport wing box structure 12a (see FIG. 1A) or stabilizer box structure 12b (see FIG. 1A) with continuous integrated sandwich panels 62 (see FIG. 1B) having facesheets 70 sandwiching one or more core portions 66 and adjacent dense packs 80 oriented in an axial direction. The box structure 12 preferably has a unitary configuration 26 (see FIG. 1A) with an increased skin panel stiffness ratio (soft facesheets, such as composite skin facesheets, with hard dense packs, such as comprising a type of spar cap). The one-piece unitary configuration 26 provides for a single, one-piece structure, as compared to a three-piece structure of existing wing box designs (tip-to-tip versus outboard wing left and right sides joined to the fuselage of the air vehicle 10 (see FIG. 1A)). Disclosed embodiments of the box structure 12 and method 300 of making the same, provide ply layups tailored for specific load applications (e.g., axially hard, near orthogonal unidirectional tape laminate layups), used for stable dense packs 80 for carrying all significant box bending in axial tension and compression loads, and axially soft facesheets 70 for carrying primarily torsion and pressure loads in shear. The integrated sandwich panels 62 are preferably integrally stabilized with a sandwich construction needing very few stabilizing ribs 48, versus existing wing box construction with multiple stringers and ribs. Fewer stabilizing ribs 48 may allow for a greater internal fuel tank access, which may reduce the number of service doors and support structure, such as access openings 110 (see FIG. 2C).

Moreover, disclosed embodiments of the box structure 12 and method 300 of making the same, may provide, spar 40 and stabilizing rib 48 to integrated sandwich panel 62 joining with secondarily bonding elements 88, such as with an adhesive material 90 (see FIG. 2B). Adhesive materials may replace the use of numerous fasteners that may be found in existing wing box structures. Damage arrestment elements 92 (see FIG. 2B) for the bonded join may consist of mechanical fasteners 94 (see FIG. 2B) at the spar 40 and stabilizing rib 48 attached to the integrated sandwich panel 62. The number of widely spaced, small diameter damage arrestment elements or other fasteners may be significantly reduced as compared to existing wing box structures. With the box structure 12 and method 300 disclosed herein, most fasteners 156 (see FIG. 1A) may be located outside of a box structure boundary 158 for electromagnetic (e.g., lightning protection), installation (less sealing needed to prevent potential fuel leaks), and accessibility for manufacturing, serviceability, and reparability reasons. Reduced lightning protection risk may result due to using fewer fasteners through the integrated sandwich panels 62. Further, the plurality of spars 40 may be formed with a spar sandwich construction 97 (see FIG. 10) which provides increased stability to the box structure 12.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A box structure for carrying load, the box structure comprising:
   upper and lower composite integrated sandwich panels;
   the integrated sandwich panels having facesheets sandwiching one or more core portions and adjacent dense packs oriented in an axial direction; and,
   a plurality of spars, each spar comprising a web and web attachments and having a spar length in the axial direction, the plurality of spars being connected to the integrated sandwich panels with the web attachments located at the dense packs;
   wherein the facesheets are configured to carry primarily torsion and pressure loads in shear and no significant axial loads, and wherein the dense packs are configured to carry all significant box bending in axial tension and compression loads.

2. The structure of claim 1 wherein the facesheets each have a facesheet composite ply layup substantially comprised of bias oriented plies, the facesheet composite ply layup designed to enable the facesheets to provide primarily continuous torsion, shear, and pressure load paths.

3. The structure of claim 1 wherein the facesheets each have a facesheet composite ply layup comprising 70%-80% bias oriented plies with fibers oriented at plus or minus forty-five degrees (±45°) or about plus or minus forty-five degrees (±45°); 10%-20% plies with fibers oriented at ninety degrees (90°) or about ninety degrees (90°); and 0%-20% unidirectional plies with unidirectional fibers oriented at zero degrees (0°) or about zero degrees (0°).

4. The structure of claim 1 wherein the dense packs each have a dense pack composite ply layup comprising a substantially orthogonal, unidirectional composite tape laminate comprised of unidirectional plies oriented at zero degrees (0°) or about zero degrees (0°), the dense pack composite ply layup designed to enable the dense packs to provide all significant continuous bending and axial load paths.

5. The structure of claim 1 wherein the dense packs each have a dense pack composite ply layup comprising 70%-100% substantially orthogonal unidirectional plies with unidirectional fibers oriented at zero degrees (0°) or about zero degrees (0°); 0%-25% bias oriented plies with fibers oriented at an orientation in a range of plus or minus fifty degrees (±50°) to plus or minus seventy-five degrees (±75°); and 0%-10% plies with fibers oriented at ninety degrees (90°).

6. The structure of claim 1 further comprising a plurality of stabilizing ribs, wherein the plurality of stabilizing ribs and the plurality of spars are bonded to and disposed between the integrated sandwich panels to form a bonded box structure.

7. The structure of claim 6 wherein each integrated sandwich panel is stabilized with a sandwich construction allowing for a reduction in number of the plurality of stabilizing ribs disposed between the integrated sandwich panels.

8. The structure of claim 6 further comprising one or more damage arrestment elements comprising one or more mechanical fasteners, wherein the one or more damage arrestment elements are configured for fastening the plurality of stabilizing ribs to each integrated sandwich panel, are configured for fastening the plurality of spars to each integrated sandwich panel, or are configured for fastening the plurality of spars and the plurality of stabilizing ribs to each integrated sandwich panel.

9. The structure of claim 1 wherein the box structure has a unitary configuration and comprises one of a transport wing box including an aircraft wing box; a stabilizer box including a horizontal stabilizer, a vertical stabilizer, a tailplane, and a canard; a rotorcraft rotor blade; a helicopter blade; an air vehicle cantilevered structure; an air vehicle torque box structure; a windmill structure including a windmill blade; an automobile structure including an automobile spoiler; and a watercraft structure including a boat rotor blade.

10. The structure of claim 1 wherein the one or more core portions comprises a honeycomb core, a foam core, a foam core with fiber reinforcement, a closed cell foam, or a truss structure.

11. The structure of claim 1 wherein each integrated sandwich panel has an increased panel stiffness ratio due to hard, axially stiff dense packs being fully stabilized by the integrated sandwich panel and the spar webs.

12. The structure of claim 1 wherein each of the plurality of spars has a spar sandwich construction comprising a core portion sandwiched between at least two spar facesheets, each spar facesheet having a spar facesheet composite ply layup comprised of a substantially quasi-isotropic composite tape laminate.

13. An air vehicle having a bonded box structure for carrying load, the air vehicle comprising:
an airfoil frame having a first tip and a second tip; and,
a bonded box structure attached to the airfoil frame, the bonded box structure comprising:
upper and lower composite integrated sandwich panels continuous from the first tip to the second tip of the airfoil frame, the integrated sandwich panels having facesheets sandwiching one or more core portions and adjacent dense packs oriented in an axial direction; and,
a plurality of spars, each spar comprising a web and web attachments and having a spar length in the axial direction, the plurality of spars being connected to the integrated sandwich panels with the web attachments located at the dense packs,
wherein the facesheets are configured to carry primarily torsion and pressure loads in shear and no significant axial loads, and wherein the dense packs are configured to carry all significant box bending in axial tension and compression loads.

14. The air vehicle of claim 13 further comprising a plurality of stabilizing ribs bonded to and disposed between the integrated sandwich panels from the first tip to the second tip of the airfoil frame.

15. The air vehicle of claim 13 wherein the facesheets each have a facesheet composite ply layup substantially comprised of bias oriented plies, the facesheet composite ply layup designed to enable the facesheets to provide primarily continuous torsion, shear, and pressure load paths.

16. The air vehicle of claim 13 wherein the dense packs each have a dense pack composite ply layup comprising a substantially orthogonal, unidirectional composite tape laminate comprised of unidirectional plies oriented at zero degrees (0°) or about zero degrees (0°), the dense pack composite ply layup designed to enable the dense packs to provide all significant continuous bending and axial load paths.

17. The air vehicle of claim 13 wherein each integrated sandwich panel has an increased panel stiffness ratio due to hard, axially stiff dense packs being fully stabilized by the integrated sandwich panel and the spar webs.

18. A method of making a bonded box structure for an air vehicle, the method comprising the steps of:
forming a pair of integrated sandwich panels, each panel formed by:
fabricating a composite skin by sandwiching a core portion between at least two composite facesheets, each composite facesheet formed by laying up a facesheet composite ply layup substantially comprised of bias oriented plies with, and designing the facesheet composite ply layup to enable the composite skin to provide continuous torsion, shear, and pressure load paths; and,
joining a plurality of dense packs to the composite skin, each dense pack formed by laying up a dense pack composite ply layup comprised of a substantially orthogonal, unidirectional composite tape laminate, and designing the dense pack composite ply layup to enable the dense packs to provide continuous bending and axial load paths; and,
bonding a plurality of spars and stabilizing ribs between the pair of integrated sandwich panels to form a bonded box structure for an air vehicle, the bonded box structure having a unitary configuration.

19. The method of claim 18 wherein forming each composite facesheet further comprises laying up the facesheet composite ply layup comprising 70%-80% bias oriented plies with fibers oriented at plus or minus forty-five degrees (±45°) or about plus or minus forty-five degrees (±45°); 10%-20% plies with fibers oriented at ninety degrees (90°) or about ninety degrees (90°); and 0%-20% unidirectional plies with unidirectional fibers oriented at zero degrees (0°) or about zero degrees (0°).

20. The method of claim 18 wherein forming each dense pack further comprises laying up the dense pack composite ply layup comprising 70%-100% substantially orthogonal unidirectional plies with unidirectional fibers oriented at zero degrees (0°) or about zero degrees (0°); 0%-25% bias oriented plies with fibers oriented at an orientation in a range of plus or minus fifty degrees (±50°) to plus or minus seventy-five degrees (±75°); and 0%-10% plies with fibers oriented at ninety degrees (90°).

21. The method of claim 18 wherein bonding the plurality of spars and stabilizing ribs between the pair of integrated sandwich panels further comprises secondarily bonding the plurality of spars and stabilizing ribs to the pair of integrated sandwich panels with a bonding element comprising an adhesive material.

22. The method of claim 18 further comprising fabricating the plurality of spars in a spar sandwich construction by sandwiching a core portion between at least two spar facesheets, each spar facesheet formed by laying up a spar facesheet composite ply layup comprised of a substantially quasi-isotropic composite tape laminate.

23. The method of claim 18 further comprising fastening the plurality of spars and stabilizing ribs to each integrated sandwich panel with one or more damage arrestment elements comprising one or more mechanical fasteners.

24. The method of claim 18 further comprising reducing a number of fasteners on the bonded box structure by positioning the fasteners outside of a box structure boundary, thus resulting in reduced lightning strike risk to the bonded box structure.

25. The method of claim 18 wherein bonding the plurality of spars and stabilizing ribs between the pair of integrated sandwich panels further comprises forming one or more spar closeout joints to bond the plurality of spars to the dense packs of each integrated sandwich skin panel.

* * * * *